United States Patent
Ise et al.

(10) Patent No.: US 9,274,754 B2
(45) Date of Patent: Mar. 1, 2016

(54) PROGRAM GENERATING APPARATUS, PROGRAM GENERATION METHOD AND COMPUTER READABLE MEDIUM

(75) Inventors: Kotaro Ise, Kawasaki (JP); Daisuke Ajitomi, Setagaya-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 13/536,263

(22) Filed: Jun. 28, 2012

(65) Prior Publication Data

US 2013/0080994 A1 Mar. 28, 2013

(30) Foreign Application Priority Data

Sep. 28, 2011 (JP) ................................ 2011-212684

(51) Int. Cl.
G06Q 10/00 (2012.01)
G06F 15/16 (2006.01)
H04L 9/32 (2006.01)
G06F 17/28 (2006.01)
G06F 9/44 (2006.01)
G06F 17/00 (2006.01)
G06Q 50/00 (2012.01)

(52) U.S. Cl.
CPC .. *G06F 8/30* (2013.01); *G06F 9/44* (2013.01); *G06F 17/00* (2013.01); *G06Q 50/00* (2013.01)

(58) Field of Classification Search
CPC .......... G06Q 10/06; G06Q 10/10; G06F 9/54; G06F 17/30165; G06F 17/3089; G06F 17/30867; G06F 17/30657; G06F 17/30997; G06F 9/4443; H04L 12/5895; H04L 2209/60; H04L 2209/80
See application file for complete search history.

(56) References Cited

U.S. PATENT DOCUMENTS

2005/0097508 A1* 5/2005 Jacovi ................... G06F 9/4446 717/103
2006/0212545 A1* 9/2006 Nichols .............. G06Q 20/0855 709/219

(Continued)

FOREIGN PATENT DOCUMENTS

| CN | 102081544 | 6/2011 |
| JP | 2009-110300 | 5/2009 |
| JP | 2009-523272 | 6/2009 |

OTHER PUBLICATIONS

Cesar A.C. Teixeira et al., Taking advantage of contextualized interactions while users watch TV, Feb. 9, 2010, [Retrieved on Oct. 19, 2015]. Retrieved from the internet: <URL: http://link.springer.com/article/10.1007/s11042-010-0481-7> 21 Pages (587-607).*

(Continued)

*Primary Examiner* — Thuy Dao
*Assistant Examiner* — Anibal Rivera
(74) *Attorney, Agent, or Firm* — Oblon, McClelland, Maier & Neustadt, L.L.P.

(57) ABSTRACT

In one embodiment, there is provided a program generating apparatus. The apparatus includes: a generator configured to generate a first program based on a second program and a third program. The second program includes a procedure of communicating with an operating apparatus through a network. The third program includes a procedure of allowing a first service and a function of the operating apparatus to collaborate with each other. The first program includes a procedure of realizing a collaboration service in which the first service and the function of the operating apparatus collaborate with each other through the network.

15 Claims, 25 Drawing Sheets

(56) References Cited

U.S. PATENT DOCUMENTS

| | | | |
|---|---|---|---|
| 2007/0083607 A1 | 4/2007 | Thompson et al. | |
| 2008/0126486 A1* | 5/2008 | Heist | G06Q 10/10 709/205 |
| 2009/0249321 A1* | 10/2009 | Mandyam | G06F 8/65 717/171 |
| 2009/0265732 A1* | 10/2009 | Ide | G06Q 30/0241 715/781 |
| 2009/0271778 A1* | 10/2009 | Mandyam | G06Q 10/06 717/171 |
| 2010/0131359 A1* | 5/2010 | Ting | G06Q 30/0248 726/27 |
| 2010/0161417 A1* | 6/2010 | Mitsui | G06Q 30/0256 715/769 |
| 2010/0257451 A1* | 10/2010 | Halevi | G06F 15/16 715/733 |
| 2011/0099068 A1* | 4/2011 | Takano | G06Q 30/02 719/328 |
| 2011/0154039 A1* | 6/2011 | Liu | H04L 63/061 713/170 |
| 2011/0161419 A1* | 6/2011 | Chunilal | G06F 17/30867 709/204 |
| 2011/0179427 A1* | 7/2011 | Krishnamoorthy | G06F 9/541 719/328 |
| 2011/0208822 A1* | 8/2011 | Rathod | G06Q 30/02 709/206 |
| 2011/0258015 A1* | 10/2011 | Garrigan | G06Q 10/06 705/321 |
| 2011/0288888 A1* | 11/2011 | Gazula | G06Q 10/10 705/3 |
| 2012/0066670 A1* | 3/2012 | McCarthy | H04L 41/0806 717/169 |
| 2012/0069131 A1* | 3/2012 | Abelow | G06Q 10/067 715/740 |
| 2012/0089659 A1* | 4/2012 | Halevi | G06F 17/243 709/201 |
| 2012/0102506 A1* | 4/2012 | Hopmann | G06F 9/5072 719/328 |
| 2012/0266128 A1* | 10/2012 | Kato | G06F 17/30876 717/101 |
| 2012/0324419 A1* | 12/2012 | Roberts | G06Q 10/101 717/102 |
| 2013/0067303 A1* | 3/2013 | Kantor | G06F 17/30165 715/205 |

OTHER PUBLICATIONS

Dickson K.W. Chiu et al., Towards ubiquitous tourist service coordination and process integration: A collaborative travel agent system architecture with semantic web services, Jul. 2009, [Retrieved on Oct. 19, 2015]. Retrieved from the internet: <URL: http://link.springer.com/article/10.1007/s10796-008-9087-2> 16 Pages (241-256).*

Erast Athanasiadis et al., A distributed platform for persinalized advertising in digital interactive TV environments, 2010, [Retrieved on Oct. 19, 2015]. Retrieved from the internet: <URL: http://www.sciencedirect.com/science/article/pii/S0164121210000683>17 Pages (1453-1469).*

Office Action issued Aug. 29, 2014 in Japanese Patent Application No. 2011-212684 (with English translation).

Office Action issued Jun. 3, 2015, in Chinese Patent Application No. 201210269328.4, (with English-language Translation).

* cited by examiner

FIG. 3A

```
<!--
<API_Functions>
getApiInfo()
readCurrentCh()
setCurrentCh()
readChList()
</API_Functions>
--> var xmlHttp;

<!--
Give information relating to identifiers of this API program
-->
function getApiInfo()
{
    return{"apiId":"0c91356c-c16a-44c7-9709-448993b6ce07","targetModelId":"8699e324-3701-4c31-9a29-abdfe99ea93d"};
}

<!--
Transmit PUT Data "command=readCurrentCh" to http://ipaddr/control/
Change the response in JSON form.For example, {"chNum":"2","chName":"NipponTV",
"providerId":"air_digital_q123"}
-->
```

FIG. 3B

```
function readCurrentCh(ipAddr)
{
    var string url="http://"+ipAddr+"/control/";
    sendCommand(url,"command:readCurrentCh");
    var result=eval("("+xmlHttp.responseText+")");
    return result;
}

<!--
Transmit PUT Data "command=setCurrentCh, chNum=1" to http://ipaddr/control/
Change the response in JSON form.For example, ["result":"ok"}
-->
function setCurrentCh(ipAddr, chNum)
{
    var string url="http://"+ipAddr+"/control/";
    sendCommand(url,"command:setCurrentCh, chNum:"+chNum);
    var result=eval("("+xmlHttp.responseText+")");
    return result;
}
```

FIG. 3C

```
<!--
Transmit PUT Data "command=readChList" to http://ipaddr/control/
Change the response in JSON form.For example,
{"ch":[
["chNum":"2","chName":"Nippon TV","providerId":"air_digital_q123"],
["chNum":"4","chName":"Tokyo TV","providerId":"air_digital_q456"],
["chNum":"6","chName":"Yokohama TV","providerId":"ip_broadcast_g789"]
]
}
-->
function readChList(ipAddr)
{
    var string url="http://"+ipAddr+"/control/";
    sendCommand(url,"command:readChList");
    var result=eval("("+xmlHttp.responseText+")");
    return result;
}} function sendCommand(url,cmd) {
    xmlHttp=new XMLHttpRequest();
    xmlHttp.open("PUT",url,false);
    xmlHttp.send(cmd);
```

FIG. 4A

```
var string ipAddr;
<!--
If the reception channel is changed, transmit message to Twitter
--> function main()
{
    var ch,prevCh;
    prevCh=readCh()
    while(1) {
        slee(60);
        ch=readCh();
        if(ch!=prevCh) {
            sendMessage(ch);
            prevCh=ch;
        }
    }
}
```

FIG. 4B

```
<!--
Transmit message containing reception channel name to Twitter.
-->
function sendMessage(chName)
{
    var message=makeMessage(chName);
    sendMessageToTwitter(message);
    return;
}

<!--
Check the reception channel.
API-program-dependent portion:
-->
function readCh(ipAddr)
{
    var ch=readCurrentCh(ipAddr);
    return ch.chName;
}
```

*FIG. 9A*

```
<!--
<API_Functions>
getApiInfo()
readCurrentCh()
setCurrentCh()
readChList()
</API_Functions>
--> var xmlHttp;

<!--
Give information relating to identifiers of this API program
-->
function getApiInfo()
{
    return{"apiId":"0c91356c-c16a-44c7-9709-448993b6ce07","targetModelId":"8699e324-3701-4c31-9a29-abdfe99ea93d"};
}
```

FIG. 9B

```
<!--
Transmit PUT Data "command=readCurrentCh" to http://ipaddr/control/
Change the response in JSON form.For example, {"chNum":"2", "chName":"NipponTV",
"providerId":"air-digital-q123"}
-->
function readCurrentCh(ipAddr)
{
    var string url="http://"+ipAddr+"/control/";
    sendCommand(url, "command:readCurrentCh");
    var result=eval("("+xmlHttp.responseText+")");
    return result;
}

<!--
Transmit PUT Data "command=setCurrentCh, chNum=1" to http://ipaddr/control/.
Change the response in JSON form.For example, {"result":"ok"}
-->
function setCurrentCh(ipAddr, chNum)
{
    var string url="http://"+ipAddr+"/control/";
    sendCommand(url, "command:setCurrentCh, chNum:"+chNum);
    var result=eval("("+xmlHttp.responstText+")");
    return result;
}
```

FIG. 9C

```
<!--
Transmit PUT Data "command=readChList" to http://ipaddr/control/
Change the response in JSON form.For example,
{
"ch":[
 {"chNum":"2","chName":"Nippon TV","providerId":"air_digital_q123"},
 {"chNum":"4","chName":"Tokyo TV","providerId":"air_digital_q456"},
 {"chNum":"6","chName":"Yokohama TV","providerId":"ip_broadcast_g789"]
]
}
-->
function readChList(ipAddr)
{
 var string url="http://"+ipAddr+"/control/";
 sendCommand(url,"command:readChList");
 var result=eval("("+xmlHttp.responseText+")");
}]

function sendCommand(url,cmd) {
 xmlHttp=nex XMLHttpRequest();
 xmlHttp.open("PUT",url,false);
 xmlHttp.send(cmd);
} var string ipAddr;
```

FIG. 9D

```
<!--
If the reception channel is changed, transmit message to Twitter
--> function main()
{
    var ch,prevCh;
    prevCh=readCh()
    while(1) {
        slee(60);
        ch=readCh();
        if(ch!=prevCh) {
            sendMessage(ch);
            prevCh=ch;
        }
    }
}
```

*FIG. 9E*

```
<!--
Transmit message containing reception channel name to Twitter.
-->
function sendMessage(chName)
{
    var message=makeMessage(chName);
    sendMessageToTwitter(message);
    return;
}

<!--
Check the reception channel
API-program-dependent portion:
-->
function readCh(ipAddr)
{
    var ch=readCurrentCh(ipAddr);
    return ch.chName;
}
```

PROGRAM GENERATING APPARATUS, PROGRAM GENERATION METHOD AND COMPUTER READABLE MEDIUM

This application claims priority from Japanese Patent Application No. 2011-212684, filed on Sep. 28, 2011, the entire contents of which are hereby incorporated by reference.

BACKGROUND

1. Field

Embodiments described herein relate to a program generator.

2. Description of the Related Art

With the development of the Internet, various apparatus other than personal computers have come to incorporate a communication function. Apparatus having a communication function include various apparatus such as cell phones, power meters, cars, and home appliances such as air-conditioners and TV receivers.

On the other hand, in recent years, as various apparatus other than personal computers have come to incorporate a communication function, new services (hereinafter referred to as network collaboration services) have been appearing in which services implemented on networks such as cloud services collaborate with apparatus having a communication function. Such network collaboration services allow users to receive a wider variety of services. For example, services implemented on networks are provided by servers that are installed on the Internet by ASPs (application service providers) that provide those services. An example network collaboration service is a service in which a service implemented on the Internet is a cloud collaboration service. And an example cloud collaboration service is a service in which the cloud service is Twitter (trade name) an apparatus having a communication function is a TV receiver. In this case, a specific cloud collaboration service is conceivable in which information of the channel of a program being watched on the TV receiver of a user is acquired automatically and contributed to Twitter automatically.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention:

FIGS. 3A-3C show an example API program of a case that an operating apparatus 13 is a TV receiver;

FIGS. 4A and 4B show an example logic program;

FIGS. 9A-9E show an example execution program;

DETAILED DESCRIPTION

Figure 1:
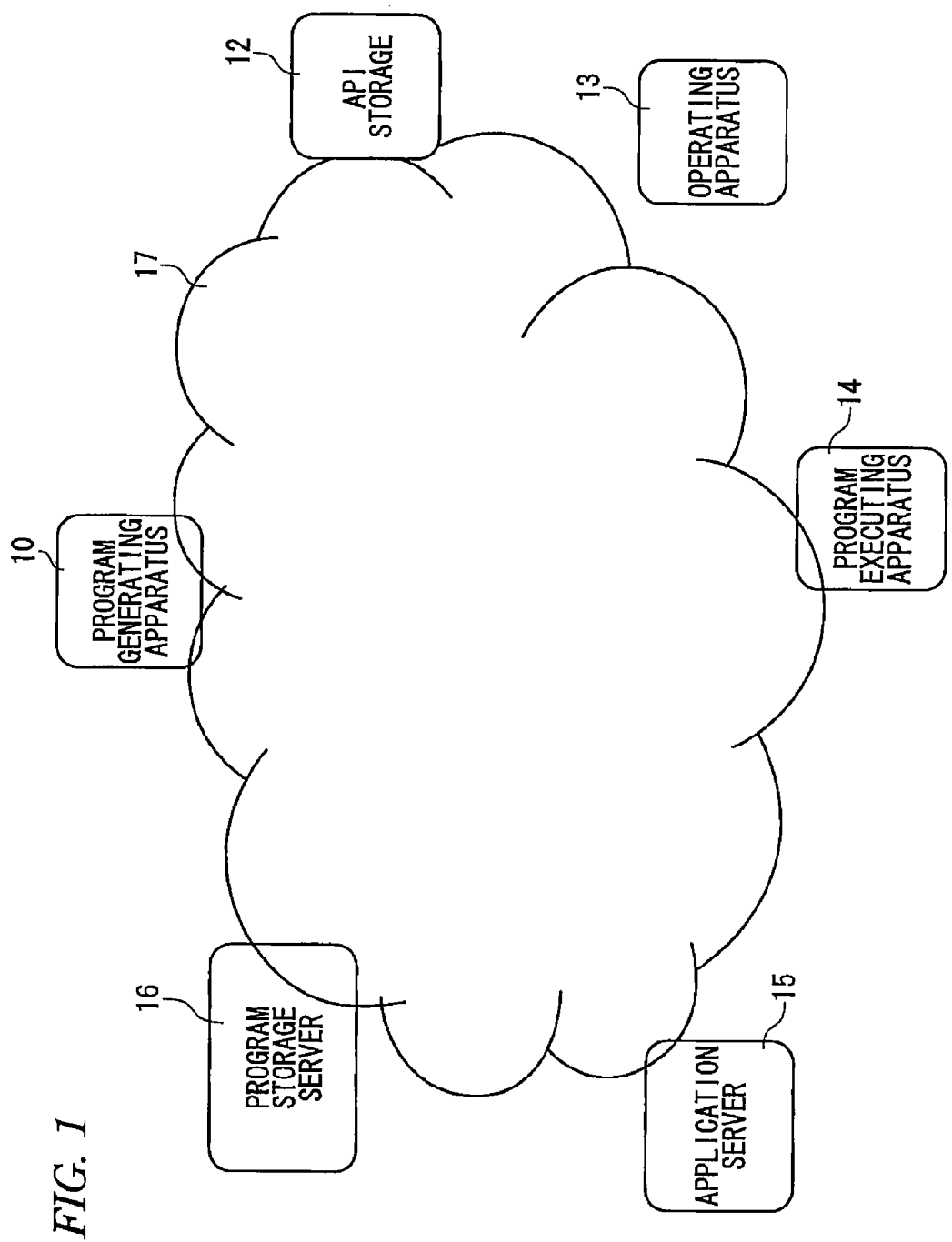
FIG. 1 is a block diagram of a system according to a first embodiment.

According to exemplary embodiments of the present invention, there is provided a program generating apparatus. The apparatus includes: a generator configured to generate a first program based on a second program and a third program. The second program includes a procedure of communicating with an operating apparatus through a network. The third program includes a procedure of allowing a first service and a function of the operating apparatus to collaborate with each other. The first program includes a procedure of realizing a collaboration service in which the first service and the function of the operating apparatus collaborate with each other through the network.

Embodiments of the present invention will be hereinafter described with reference to the drawings. The same items will be given the same reference symbol in the drawings and will not be described redundantly.

Embodiment 1

FIG. 1 is block diagram of a system according to a first embodiment of the invention.

In the system according to the first embodiment of the invention, a program generating apparatus 10, an API storage 12, plural operating apparatus 13, plural program executing apparatus 14, an application server 15, and a program storage server 16 are connected to each other via a network 17.

Each operating apparatus 13 is an apparatus which performs a service operation for a user. For example, each operating apparatus 13 is a TV receiver or a PVR (personal video recorder, hard disk recorder).

The application server 15 is a server which provides a service for a service receiving party over the network 17. The service provided by the application server 15 is a cloud service, for example.

The API storage 12 is an apparatus which stores API programs and supplies an API program to another apparatus over the network 17. The API (application program interface) program ("second program" recited in claim) is a program which realizes a communication procedure for accessing an operating apparatus 13 over the network 17. The communication procedure for accessing an operating apparatus 13 over the network 17 varies depending on what is to be realized by accessing the operating apparatus 13 (e.g., control of the operating apparatus 13 or use of a function of the operating apparatus 13). And what can be realized by accessing an operating apparatus 13 varies depending on the functions of the operating apparatus 13. Therefore, different API programs are assigned depending on the functions of an operating apparatus 13 and what is to be realized by accessing the operating apparatus 13. More specifically, if the model of an operating apparatus 13 of the system of FIG. 1 is changed, an API program suitable for the new model is generated. API programs are generated for plural respective operating apparatus 13. Plural API programs may be generated for respective purposes to be attained by accessing a single operating apparatus 13.

The program storage server 16 is an apparatus which stores logic programs ("third program" recited in claim) each of which is a program which uses an API program and serves to cause the service provided by the application server 15 to collaborate with an operating apparatus 13. The program storage server 16 supplies a logic program to another apparatus over the network 17.

The program generating apparatus 10 is an apparatus which generates an execution program ("first program" recited in claim) which causes the service provided by the application server 15 to collaborate with a function of an operating apparatus 13 on the basis of an API program and a logic program. The program generating apparatus 10 supplies the generated execution program to another apparatus over the network 17. The execution program is a program which can be run by a program executing apparatus 14 (described later). The execution program may be in any form as long as it can be run by a program executing apparatus 14, and may be a program that is not in binary form. Example forms of the execution program are Perl, JavaScript (registered trademark), Ruby (trade name), and Java (registered trademark).

Each program executing apparatus 14 has a function of executing an execution program.

Although FIG. 1 shows the single application server 15, program storage server 16, program generating apparatus 10, program executing apparatus 14, operating apparatus 13, and API storage 12, it is assumed in the embodiment that plural program executing apparatus 14 and operating apparatus 13 are provided. Each of the other kinds of apparatus may also be provided in plurality.

Figure 2:
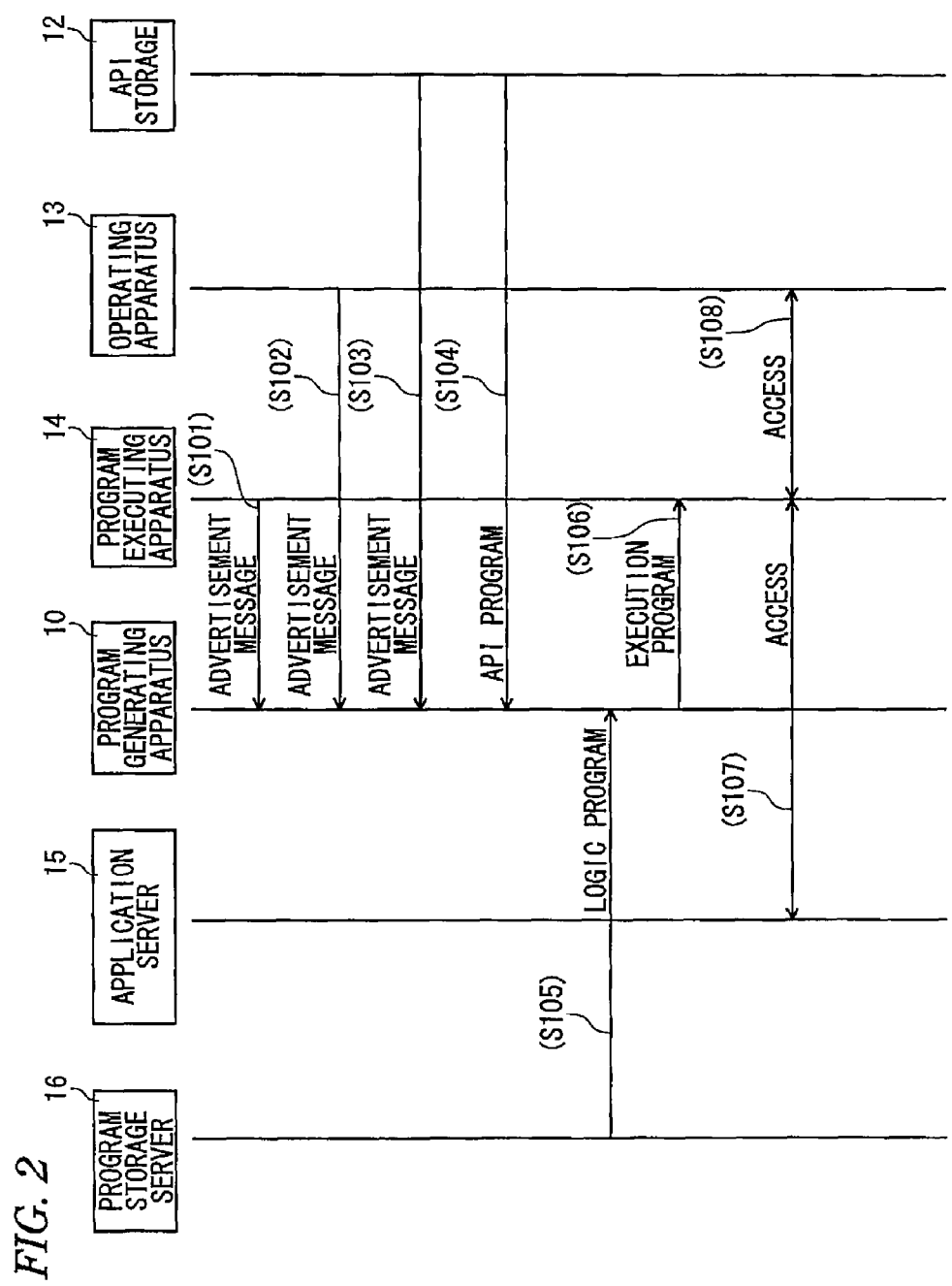
FIG. 2 is a sequence diagram showing how the system of FIG. 1 operates.

Next, how the system of FIG. 1 operates will be described with reference to FIG. 2, which shows a communication sequence of the system of FIG. 1.

At steps S101-S103, each program executing apparatus 14, each operating apparatus 13, and the API storage 12 broadcast or multicast advertisement messages regularly. For example, each advertisement message contains an apparatus type, a provider identifier, a model identifier, an individual apparatus identifier, and an apparatus IP address. Each advertisement message is transmitted in the form of IP packets, for example.

Each kind of information contained in an advertisement message will be described below.

The apparatus type is an identifier for discrimination between the program executing apparatus 14, the operating apparatus 13, and the API storage 12. It is preferable that the apparatus type be an identifier that enables identification of the type of each operating apparatus 13. The type of each operating apparatus 13 means a TV receiver, a PVR, or the like.

The provider identifier is an identifier for identification of a manufacturer of the apparatus.

The model identifier is an identifier for identification of a model of the apparatus. It is preferable that the model identifier be a UUID (universally unique identifier), for example. The use of a UUID makes it possible to assign different identifiers to models of different manufacturers.

The individual apparatus identifier is an identifier for unique identification of the apparatus. It is preferable that the individual apparatus identifier be a UUID, for example. The individual apparatus identifier need not always be an identifier which enables unique identification of the apparatus by itself. For example, each apparatus may be identified uniquely by a combination of its model identifier and individual apparatus identifier.

The apparatus IP address is an IP address assigned to the apparatus.

The kinds of information contained in each advertisement message have been described above.

The description of the operation of the system according to the embodiment is now restarted.

At step S104, the program generating apparatus 10 requests the API storage 12 to send an API program by referring to the advertisement message acquired from the API storage 12 and receives an API program from the API storage 12. The program generating apparatus 10 makes, according to HTTP, a request for sending of an API program that is directed to the apparatus IP address (API acquisition URL: e.g., http://192.168.0.1/api/) that is contained in the advertisement message acquired from the API storage 12.

At step S105, the program generating apparatus 10 requests the program storage server 16 to send a logic program by referring to the advertisement message acquired from the program storage server 16 and receives a logic program from the program storage server 16. The program generating apparatus 10 makes a request for sending of a logic program that is directed to the apparatus IP address that is contained in the advertisement message acquired from the program storage server 16.

The program generating apparatus 10 generates an execution program using the acquired API program and logic program. At step S106, the program generating apparatus 10 sends the generated execution program to a program executing apparatus 14. The program generating apparatus 10 sends, according to HTTP, the generated execution program to the IP address of a program executing apparatus 14 contained in the advertisement message acquired from it.

The program executing apparatus 14 runs the received execution program. In doing so, at step S107 and S108, the program executing apparatus 14 accesses the application server 15 and the operating apparatus 13 over the network 17.

Collaboration between the operating apparatus 13 and the application server 15 is realized by the program executing apparatus 14's running the execution program. A detailed collaboration operation will be described later using a specific example.

The description of the operation of the system of FIG. 1 completes here.

In the embodiment, a communication procedure of access to each operating apparatus 13 is not the one corresponding to a standard protocol that is predetermined in the system as a whole but realized by an API program that is set for each operating apparatus 13. The fact that no communication protocol is set for the system as a whole makes it possible to develop and install an operating apparatus 13 and an application server 15 independent of each other. Since an API program can be realized so as to be suitable for a function of an operating apparatus 13, a collaboration service that makes good use of the function of the operating apparatus 13 can be realized by accessing the operating apparatus 13 using an execution program generated by using the API program.

In the embodiment, an execution program is run by a program executing apparatus 14 which is separate from an operating apparatus 13. As a result, the system can work even if an execution program requires a computation amount that an operating apparatus 13 cannot accommodate. In particular, where the application server 15 is a server of an ASP on the Internet and a program executing apparatus 14 is an apparatus such as a softphone or a PC which uses a service (ASP service) provided by the ASP, the program executing apparatus 14 is expected to have such computation ability as to be able to follow ASP services that evolve very fast.

Next, an example API program will be described. Although in the embodiment a program to be used for accessing an operating apparatus 13 is an API program which is a program including an API, the invention is not limited to such a case. That is, it suffices that a program to be used for accessing an operating apparatus 13 be a program that prescribes a procedure for accessing the operating apparatus 13; it need not always be a program including an API.

FIGS. 3A-3C show an example API program of a case that an operating apparatus 13 is a TV receiver.

The API program shown in FIGS. 3A-3C is pseudocode written in JavaScript (registered trademark). An API program is set for each operating apparatus 13, and another apparatus (e.g., program executing apparatus 14) can access an operating apparatus 13 according to a communication procedure that is determined by the API program. In the embodiment, an API program may be held by either the API storage 12 or an operating apparatus 13 capable of making access using the API program.

In the API program shown in FIGS. 3A-3C, the names of API functions to be used for accessing the operating apparatus 13 is written between <API_Functions> and </API_Functions>. That is, functions getApliInfo( ), readCurrentCh( ), setCurrentCh( ), and readChList( ) are defined in the example of FIGS. 3A-3C.

The function getApliInfo( ) is an API for acquiring information relating to the API program by accessing the operating apparatus 13.

The information relating to the API program is, specifically, information including an API identifier for identification of the API program and a target model identifier indicating a model identifier of the operating apparatus 13 to be accessed using the API program. In the example of FIGS. 3A-3C, the API identifier is "0c91356c-c16a-44c7-9709-448993b6ce07" and the target model identifier is "8699e324-3701-4c31-9a29-abdfe99ea93d."

The function readCurrentCh( ) is an API for acquiring information of a channel of a broadcast being received by the operating apparatus 13 (in this example, TV receiver). For example, a channel number (chNum) and a channel name (chName), and a broadcast provider identifier (providerId) of a reception channel are acquired. The broadcast provider identifier (providerId) is uniquely assigned to a broadcast provider.

The function setCurrentCh( ) is an API for setting a channel of a broadcast to be received by the operating apparatus 13 by accessing the operating apparatus 13. When given a channel number by this API, the operating apparatus 13 sets the reception channel to the specified channel.

The function readChList( ) is an API for acquiring information of broadcast-receivable channels of the operating apparatus 13 (TV receiver). More specifically, a channel number (chNum) and a channel name (chName), and a broadcast provider identifier (providerId) of each broadcast-receivable channel are acquired using this API.

FIGS. 4A and 4B show an example logic program.

The logic program shown in FIGS. 4A and 4B is pseudocode of a program to be used for contributing, to Twitter (trade name), information to the effect that the user has changed the reception channel of the operating apparatus 13 (TV receiver).

According to this logic program, a reception channel is acquired every 60 seconds using a function main( ) and information of the new reception channel is sent to Twitter if a reception channel acquired this time is different from a preceding one. A function sendMessage( ) is used for sending information of a reception channel to Twitter. In this function, a message to be sent is generated by makeMEssage( ).

Next, how the program generating apparatus 10 operates will be described in detail with reference to FIG. 2.

When receiving an advertisement message from an operating apparatus 13, the program generating apparatus 10 stores the information (apparatus type, provider identifier, model identifier, individual apparatus identifier, and apparatus IP address) contained in the advertisement message. Information thus stored is referred to as operating apparatus information. When receiving an advertisement message from the API storage 12, the program generating apparatus 10 stores the information (apparatus type, provider identifier, model identifier, individual apparatus identifier, apparatus IP address, and API acquisition URL) contained in the advertisement message. Information thus stored is referred to as API storage information. When receiving an advertisement message from a program executing apparatus 14, the program generating apparatus 10 stores the information (apparatus type, provider identifier, model identifier, individual apparatus identifier, and apparatus IP address) contained in the advertisement message. Information thus stored is referred to as program executing apparatus information.

Next, the configuration of the program generating apparatus 10 will be described.

Figure 5:
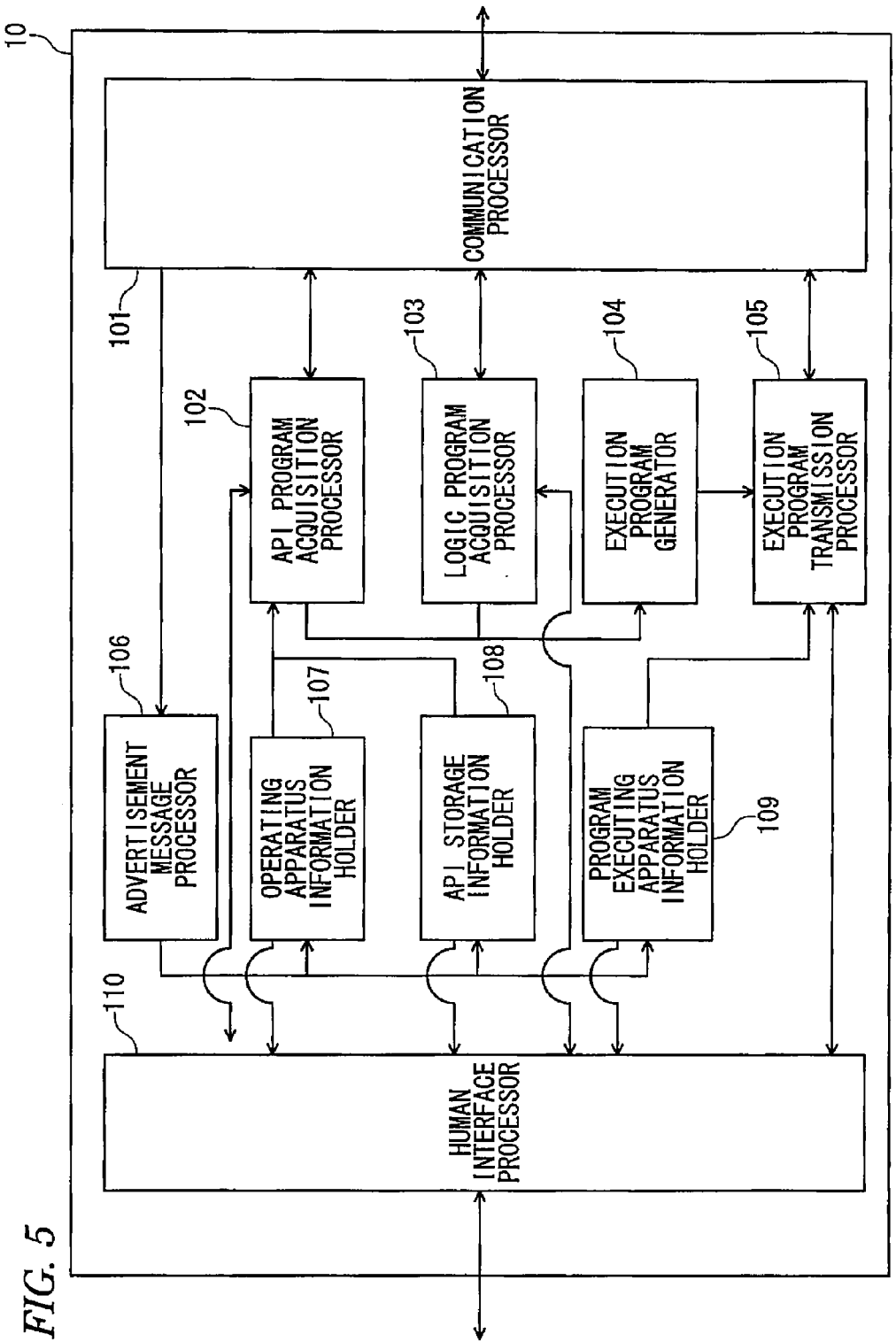
FIG. 5 is a block diagram of a program generating apparatus 10 of the system of FIG. 1.

FIG. 5 is a block diagram showing the configuration of the program generating apparatus 10.

An advertisement message processor 106 receives an advertisement message via a communication processor 101. Then, the advertisement message processor 106 judges a type of the apparatus that has sent the advertisement message on the basis of the apparatus type that is contained in the advertisement message. If the apparatus type contained in the advertisement message is "operating apparatus," the advertisement message processor 106 extracts the operating apparatus information and sends it to an operating apparatus information holder 107. If the apparatus type contained in the advertisement message is "API storage," the advertisement message processor 106 extracts the API storage information and sends it to an API storage information holder 108. If the apparatus type contained in the advertisement message is "program executing apparatus," the advertisement message processor 106 extracts the program executing apparatus information and sends it to a program executing apparatus information holder 109.

The operating apparatus information holder 107 holds pieces of operating apparatus information, and supplies the pieces of operating apparatus information held therein to a human interface processor 110 or supplies one of them to an API program acquisition processor 102.

The API storage information holder 108 holds pieces of API storage information, and supplies the pieces of API storage information held therein to the human interface processor 110 or supplies one of them to the API program acquisition processor 102.

The program executing apparatus information holder 109 holds pieces of program executing apparatus information, and supplies the pieces of program executing apparatus information held therein to the human interface processor 110 or supplies one of them to an execution program information transmission processor 105.

The human interface processor 110 processes a screen output to a display apparatus and an input from a mouse. The human interface processor 110 is implemented as a Web browser, for example.

Figure 6:
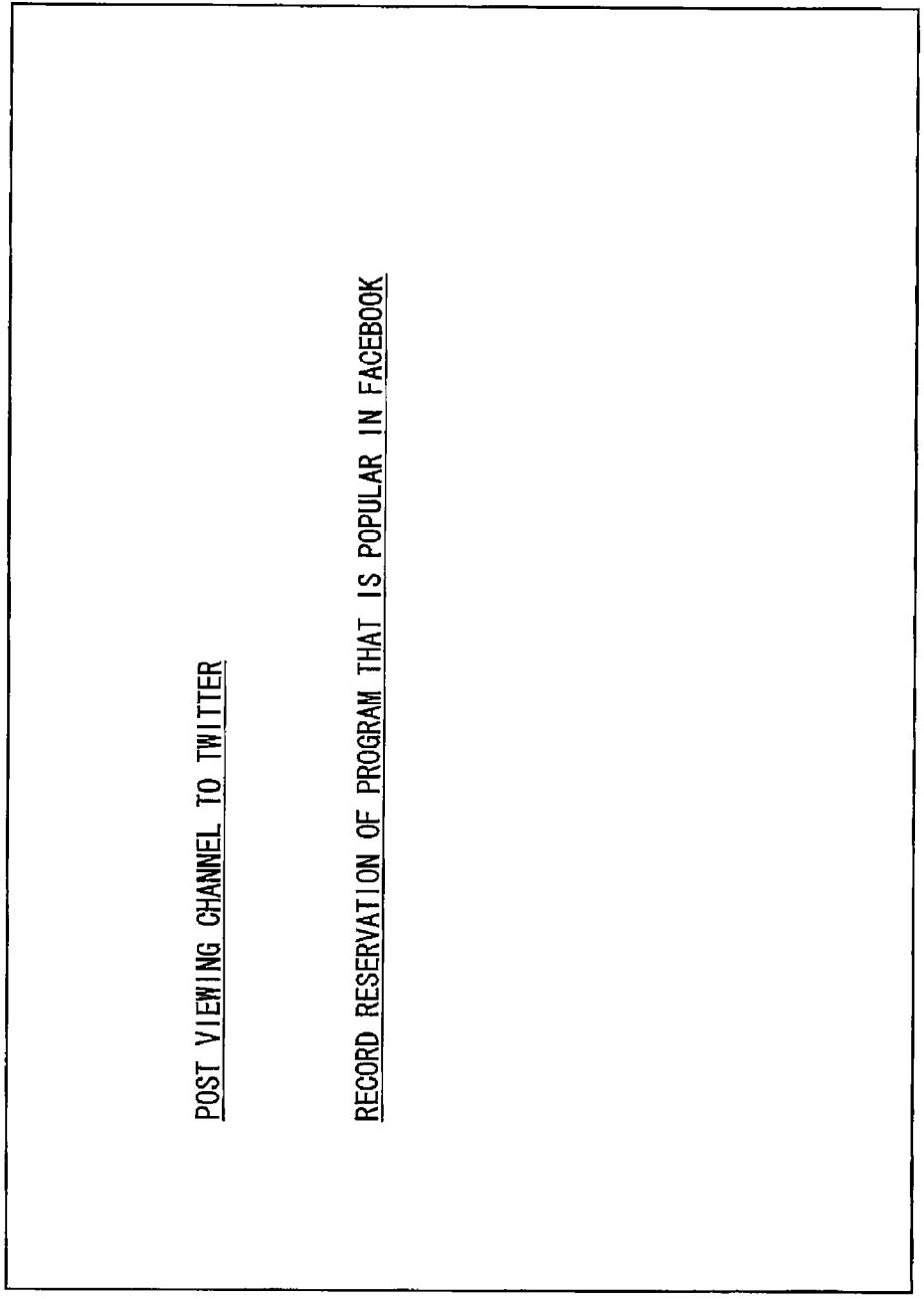
FIG. 6 shows an example logic program selection picture displayed on the screen by a human interface processor 110.

The human interface processor 110 generates a logic program selection picture showing a list of logic programs that are held by the program storage server 16, and displays it. FIG. 6 shows an example logic program selection picture displayed on the screen by the human interface processor 110. The example of FIG. 6 is of a case that the program storage server 16 holds two logic programs which are "Contribution of a viewing channel to Twitter (trade name)" and "Recording reservation of a program that is popular in Facebook (trade name)." In the following, each operation which is performed after selection of a logic program will be described with an assumption that the logic program "Contribution of a viewing channel to Twitter" was selected.

The human interface processor 110 generates an operating apparatus selection picture using the pieces of operating apparatus information stored in the operating apparatus information holder 107, and displays it. For example, the human interface processor 110 displays an operating apparatus selection picture by sending the pieces of operating apparatus information to the program storage server 16 and causing the program storage server 16 to convert the model identifiers into character strings (e.g., TV receiver, PVR, secondary battery, air-conditioner, solar panel, and power meter) representing apparatus types and icons and thereby generate a picture. Alternatively, the human interface processor 110 may display such an operating apparatus selection picture by acquiring a character string and an icon from each operating apparatus 13 as operating apparatus information.

Figure 7:
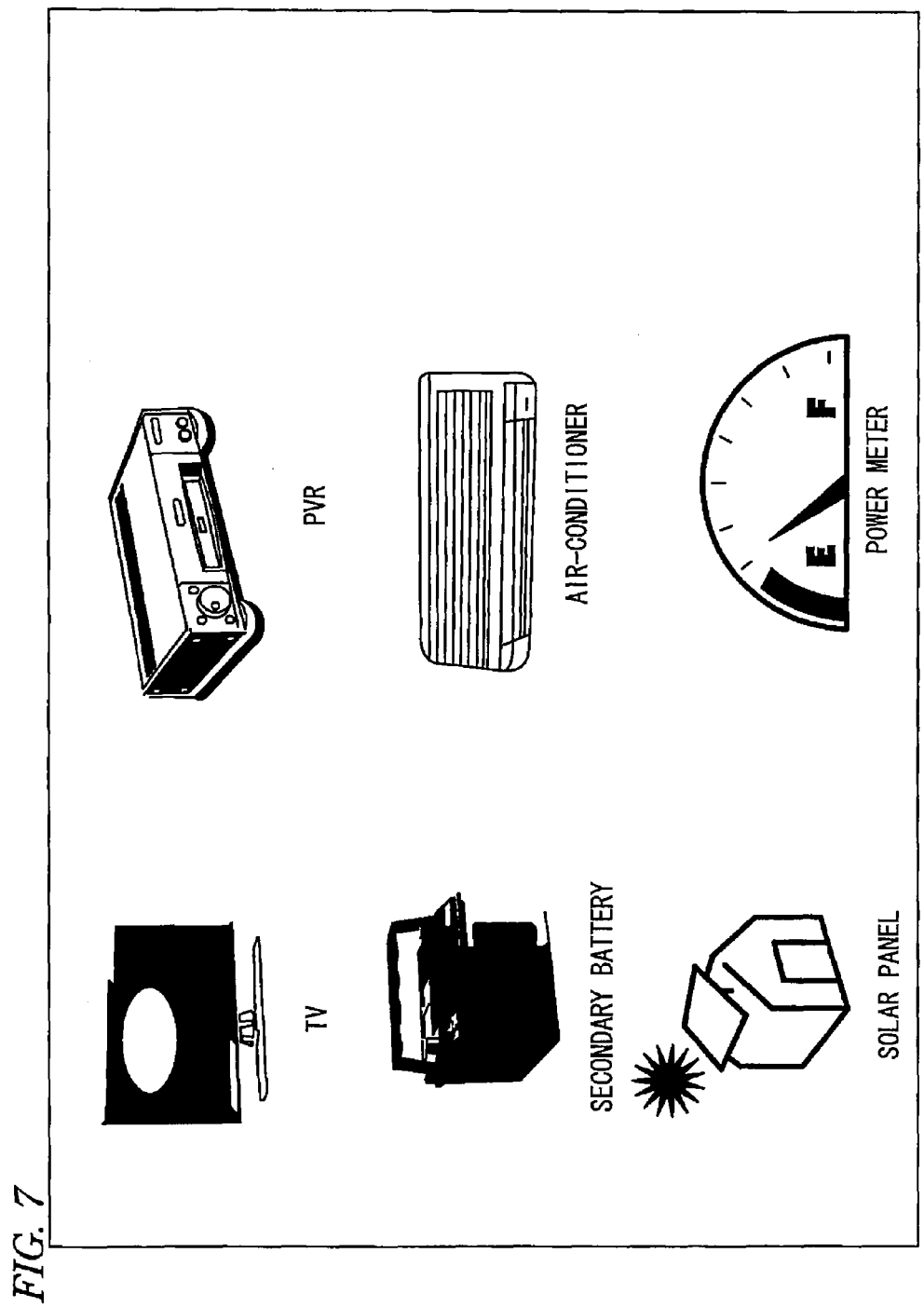
FIG. 7 shows an example operating apparatus selection picture displayed on the screen by the human interface processor 110.

FIG. 7 shows an example operating apparatus selection picture displayed on the screen by the human interface processor 110. In the example of FIG. 7, character strings and icons of a TV receiver, a PVR, a secondary battery, an air-conditioner, a solar panel, and a power meter are displayed.

When a logic program is selected through a logic program selection picture, the human interface processor 110 may display an operating apparatus selection picture in such a manner that it is indicated that operating apparatus 13 that do not allow operation of the selected logic program are unselectable. For example, such operating apparatus 13 are grayed out or are not displayed at all. When a logic program "Contribution of a viewing channel to Twitter" is selected, the TV receiver and the PVR which enable operation of the logic program are displayed ordinarily and the other operating apparatus 13 are grayed out or are not displayed at all. In the following, each operation which is performed after selection of a certain operating apparatus 13 will be described with an assumption that the TV receiver was selected.

The human interface processor 110 instructs a logic program acquisition processor 103 to acquire a logic program selected through a logic program selection picture and corresponding to the API program for an operating apparatus 13.

Figure 8:
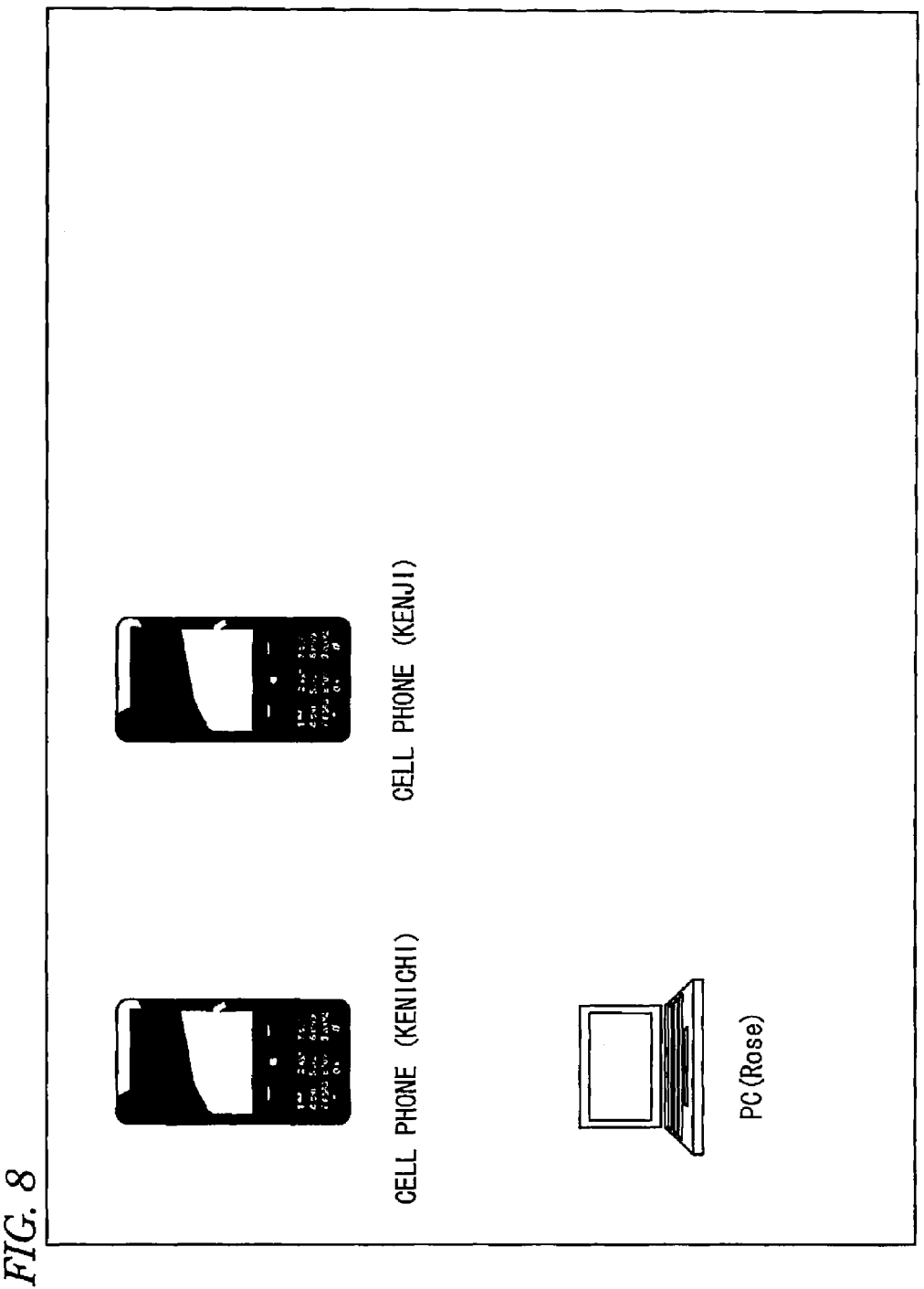
FIG. 8 shows an example program executing apparatus selection picture.

The human interface processor 110 displays a program executing apparatus selection picture on the basis of the pieces of program executing apparatus information which are held by the program executing apparatus information holder 109. FIG. 8 shows an example program executing apparatus selection picture. The human interface processor 110 may display a program executing apparatus selection picture by sending the pieces of program executing apparatus information to the program storage server 16 and causing the program storage server 16 to convert the model identifiers into character strings (e.g., cell phone and PC) representing apparatus types and icons and thereby generate a picture. Alternatively, the human interface processor 110 may also acquire information of a character string and an icon from each program executing apparatus 14 as program executing apparatus information. The human interface processor 110 may also display, in addition to a character string representing an apparatus type and an icon, a name (e.g., Kenichi, Kenji, or Rose) that was given to each program executing apparatus 14 by the user by incorporating such information in program executing apparatus information. The example program executing apparatus selection picture shown in FIG. 8 is of such a case.

The human interface processor 110 instructs the execution program transmission processor 105 to send an execution program to an externally selected program executing apparatus 14.

The description of the human interface processor 110 completes here.

The API program acquisition processor 102 acquires an API program from the API storage 12 on the basis of API storage information stored in the API storage information holder 108. More specifically, the API program acquisition processor 102 acquires an API program by accessing the API acquisition URL that is included in API storage information via the communication processor 101. The API program acquisition processor 102 supplies the acquired API program to the execution program generating apparatus 104, and supplies the API identifier of the acquired API program to the logic program acquisition processor 103.

The logic program acquisition processor 103 acquires, from the program storage server 16, a logic program selected by the human interface processor 110 through a logic program selection picture.

In a typical case, the program storage server 16 has a Web server function and provides a logic program selection picture. It is preferable that the logic program acquisition processor 103 send an API identifier to the program storage server 16 and the program storage server 16 generate, on the basis of the received API identifier, a picture including only logic programs that enable generation of an execution program.

It is assumed that the URL of the program storage server 16 to be accessed by the logic program acquisition processor 103 is given in advance. Typically, such a URL is acquired using a search service such as Google (trade name).

The logic program acquisition processor 103 supplies the acquired logic program to the execution program generating apparatus 104.

The execution program generating apparatus 104 generates an execution program using the API program received from the API program acquisition processor 102 and the logic program acquired from the logic program acquisition processor 103, and supplies the generated execution program to the execution program transmission processor 105.

FIGS. 9A-9E show an example execution program generated from the API program of FIGS. 3A-3C and the logic program of FIGS. 4A and 4B. Because of the use of JavaScript (registered trademark), the execution program of FIGS. 9A-9E can be obtained by merely by connecting the API program of FIGS. 3A-3C and the logic program of FIGS. 4A and 4B.

There are various execution program generation methods. For example, where an interpreter language, it is desirable to generate an execution program by connecting programs that are written as text data as in the example of FIGS. 9A-9E. Example interpreter languages are Java (registered trademark) and Ruby (trade name). Where a compiler language such as the C language is used for generation of an execution program, a compiler is prepared in each program executing apparatus 14. And the execution program generating apparatus 104 of the program generating apparatus 10 generates a makefile which describes a method for compiling an API file and a logic file. Therefore, where a compiler language is used, an execution program may be information including an API program, a logic program, and a makefile.

Even where a compiler language is used for generation of an execution program, it is possible to cause the execution program generating apparatus 104 to perform cross-compilation so that an execution program operates in a program executing apparatus 14 by having an identifier indicating a program execution environment of the program executing apparatus 14 included in an advertisement message sent from the program executing apparatus 14.

The execution program transmission processor 105 sends the execution program received from the execution program generating apparatus 104 to a program executing apparatus 14 according to an instruction from the human interface processor 110.

The communication processor 101 exchanges data with the network 17 according to a predetermined communication procedure.

When receiving the execution program from the program generating apparatus 10, the program executing apparatus 14 runs the received execution program. In the case of the execution program of FIGS. 9A-9E, the program executing apparatus 14 accesses the operating apparatus 13 (TV receiver) regularly and, if a reception channel that is detected by current access is different from a one that was detected by preceding access, sends information to that effect to the application server 15 (Twitter (trade name)). For example, a message "Nippon TV is being watched" is sent.

Advantages that are provided by the system according to the embodiment will be described below.

Assume a case that a user has bought a new TV receiver, that is, the functions of an operating apparatus 13 connected to the network 17 (see FIG. 1) have changed. Also assume that the new TV receiver is added with an EPG (electronic program guide) function. Where the new TV receiver is added with a new function, an execution program that enables utilization of this function can be realized by making the API program and the logic program accommodate this function. For example, an API program obtained by adding a function getEPGInfo( ) for acquiring EPG data from a TV receiver to the API program of FIGS. 3A-3C is employed as an API program for the new TV receiver. The logic program is modified so as to accommodate the function getEPGInfo( ). In sending a message to the application server 15, using an execution program that is generated from such an API program and logic program, the program executing apparatus 14 can generate a more detailed message of, for example, "The drama 'Spring has come' of Nippon TV is being watched" through conversion into the name of a program being received on a reception channel.

Conventionally, since an execution program depends on a standard communication protocol, an execution program cannot be generated flexibly so as to be adapted to a variation of the functions of an operating apparatus unless the standard communication protocol is updated. And a service that is adapted to the variation of the functions of the operating apparatus cannot be realized. In contrast, in the embodiment, an API program that is suitable for the functions of an operating apparatus 13 can be realized and a logic program that is suitable for the API program can be generated. In this manner, a variety of execution programs that utilize the functions of the operating apparatus 13 sufficiently can be generated and a variety of services can thereby be realized.

It is preferable that an API program be generated by the manufacturer of each operating apparatus 13. And it is preferable that a logic program be generated by a large, indefinite number of parties including the manufacturer and be able to be uploaded to a server on the network. Where an API program is generated by the manufacturer of each operating apparatus 13, an API program can be generated in step with evolution of each operating apparatus 13. Where a logic program is generated by a large, indefinite number of parties, a logic program can be generated in step with evolution of each operating apparatus 13.

In the embodiment, an execution program is provided separately from an operating apparatus 13 and collaboration between the application server 15 and the operating apparatus 13 is realized by a program executing apparatus 14's accessing the application server 15 and the operating apparatus 13. With this configuration, even in the case where an old operating apparatus 13 cannot directly collaborate with an evolved application server 15 because of, for example, too large a data size, a program executing apparatus 14 can realize collaboration between the new application server 15 and the old operating apparatus 13. It is desirable that each program executing apparatus 14 be such an apparatus as a cell phone or a PC capable of using the service of the application server 15.

In the embodiment, the single application server 15, program storage server 16, program generating apparatus 10, and API storage 12 and plural program executing apparatus 14 and operating apparatus 13 are provided. However, the concept of the embodiment can also be applied to a case that each of the application server 15, the program storage server 16, the program generating apparatus 10, and the API storage 12 is also provided in plurality.

A case of using two application servers 15 will be described. For example, a program executing apparatus 14 can run an execution program which enables a service that a broadcast program that is popular in a bulletin board of Facebook (trade name) is acquired, this broadcast program is reservation-recorded in an operating apparatus 13 (PVR), and, if the recorded broadcast program is reproduced, information to that effect is communicated to Twitter (trade name).

A case of using two operating apparatus 13 will be described. Where two operating apparatus 13 which are a thermometer and an air-conditioner are used, a program executing apparatus 14 can run an execution program which enables a service that a temperature is acquired from the thermometer and the setting temperature of the air-conditioner is varied so that the room temperature becomes a target value.

Although the embodiment is directed to the case of using the IP protocol, its concept can also be applied to cases of using other communication protocols such as the IPv6 protocol.

In the embodiment, the network 17 may be either a wired one or a wireless one.

For example, the program generating apparatus 10 used in the embodiment can be implemented by using a general-purpose computer as basic hardware. That is, the communication processor 101, the API program processor 102, the logic program acquisition processor 103, the execution program generating apparatus 104, the execution program transmission processor 105, the advertisement message processor 106, the operating apparatus information holder 107, the API storage information holder 108, the program executing apparatus information holder 109, and the human interface processor 110 can be implemented by causing a processor of the computer to run programs. In this case, the program generating apparatus 10 may be implemented by either installing the programs in the computer in advance or installing, in the computer when necessary, the programs stored in a storage medium such as a CD-ROM or delivered over the network 17. The operating apparatus information holder 107, the API storage information holder 108, and the program executing apparatus information holder 109 can be implemented by utilizing, as appropriate, a storage medium incorporated in or externally connected to the computer, such as a memory, a hard disk drive, a CD-R, CD-RW, DVD-RAM, or a DVD-R.

<Modification>

Next, a modification of the first embodiment will be described.

Figure 10:
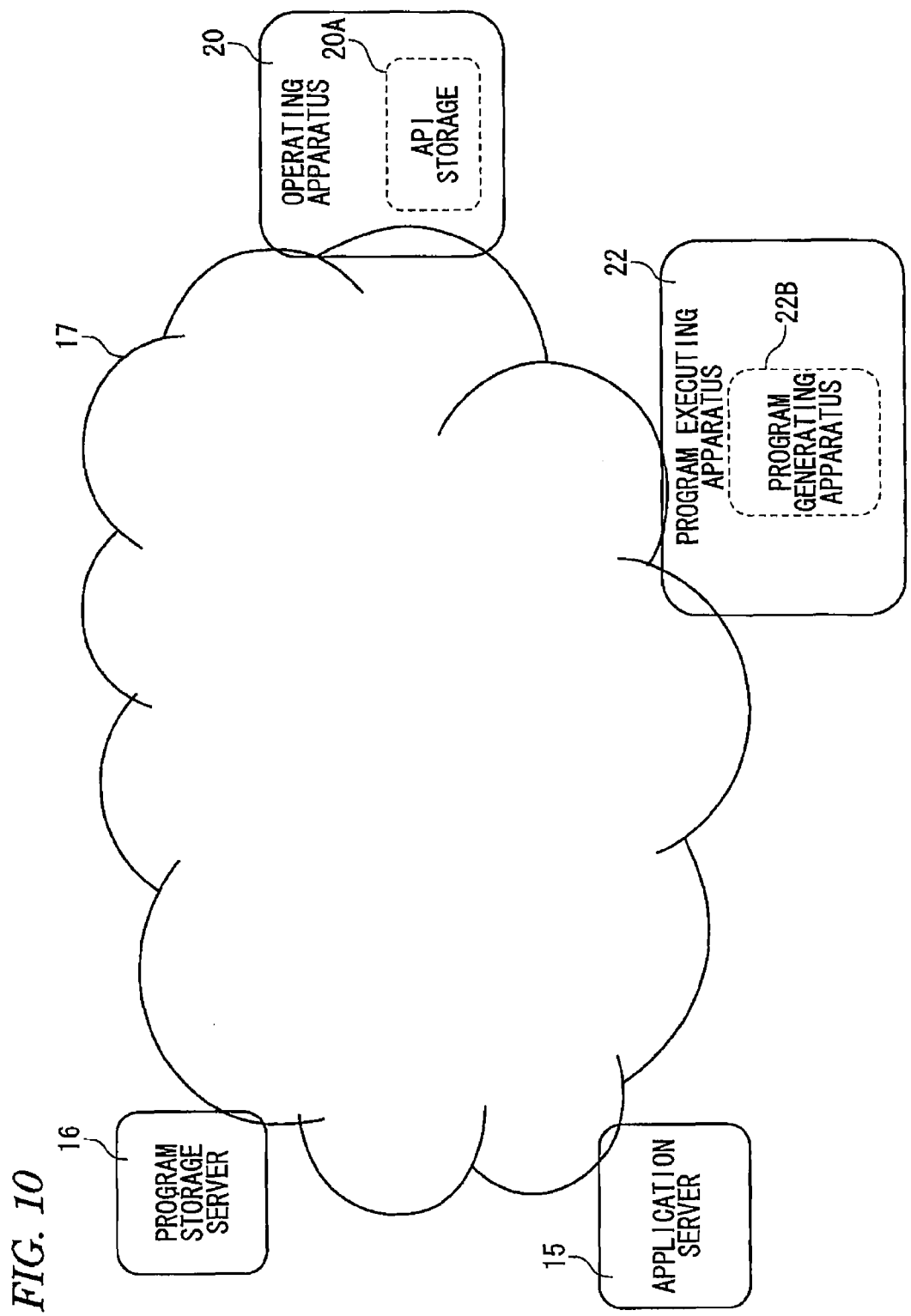
FIG. 10 is a block diagram of a system according to the modification of the first embodiment.

FIG. 10 is a block diagram of a system according to the modification of the first embodiment.

The system according to the modification of the first embodiment is different from the system according to the first embodiment in that each operating apparatus 13 is integrated with an API storage 12 and each program executing apparatus 14 and a program generating apparatus 10 are integrated with each other. In the following, an apparatus obtained by integrating an operating apparatus 13 and an API storage 12 is called an operating apparatus 20. The operating apparatus 20 is equipped with an API storage 20A which has the functions of the API storage 12. And an apparatus obtained by integrating a program executing apparatus 14 and a program generating apparatus 10 is called a program executing apparatus 22. The program executing apparatus 22 is equipped with a program generating apparatus 22B which has the functions of the program generating apparatus 10.

Each of the other apparatus has the same functions as described in the first embodiment and hence will not be described in detail.

The API storage 20A of each operating apparatus 20 stores an API program to be used for accessing the operating apparatus 20, which is in contrast to the fact that in the first embodiment the API storage 12 stores and manages API programs for the plural operating apparatus 13 together. There may occur a case that an operating apparatus 20 stores plural API programs to be used for accessing the operating apparatus 20 itself, because plural API programs may be necessary for respective things that are desired to be realized by accessing the operating apparatus 20.

Figure 11:
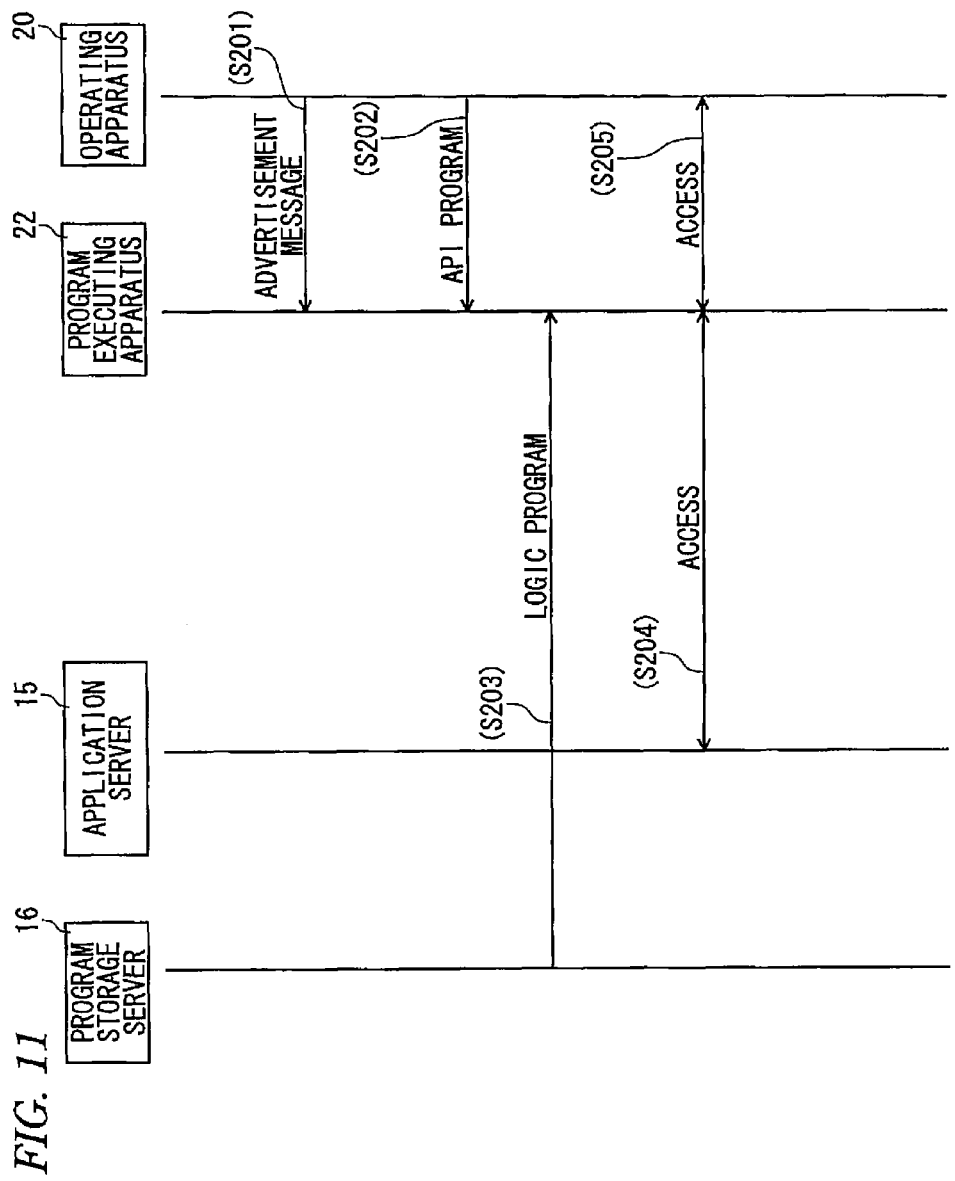
FIG. 11 is a sequence diagram showing how the system of FIG. 10 operates.

Next, how the system according to the modification operates will be described. FIG. 11 shows an operation sequence of the system of FIG. 10.

Each program executing apparatus 22 used in the modification has, in addition to the functions of the program generating apparatus 10 (see FIG. 5), the function of the program executing apparatus 14, that is, a function as provided by a program execution module for running an execution program generated by the program generating apparatus 10. Each program executing apparatus 22 need not be equipped with the execution program transmission processor 105 shown in FIG. 5.

First, at step S201, each operating apparatus 20 broadcasts or multicasts an advertisement message regularly. The advertisement message is transmitted in the form of IP packets, for example. The advertisement message contains an apparatus type, a provider identifier, a model identifier, an individual apparatus identifier, and an apparatus IP address.

The apparatus type is an identifier for identification of a type of the operating apparatus 20 (e.g., TV receiver or PVR).

The provider identifier is an identifier for identification of a manufacturer of the operating apparatus 20.

The model identifier is an identifier for identification of a model of the operating apparatus 20. It is preferable that the model identifier be a UUID (universally unique identifier), for example. The use of a UUID makes it possible to assign different identifiers to models of different manufacturers.

The individual apparatus identifier is an identifier for unique identification of the operating apparatus 20. It is preferable that the individual apparatus identifier be a UUID, for example. The individual apparatus identifier need not always be an identifier which makes it possible to identify the operating apparatus 20 without duplication by itself. For example, each operating apparatus 20 may be assigned an unduplicated value in the form of a combination of its model identifier and individual apparatus identifier.

The apparatus IP address is an IP address assigned to the operating apparatus 20.

The kinds of information contained in the advertisement message have been described above.

The description of the operation of the system according to the modification of the first embodiment is now restarted.

At step S202, a program executing apparatus 22 receives an API program from an operating apparatus 20. In doing so, the program executing apparatus 22 recognizes an API acquisition URL (e.g., http://192.168.0.1/api/) of the operating apparatus 20 from an advertisement message sent from it and sends an API program request to that IP address according to HTTP.

At step S203, the program executing apparatus 22 receives a logic program from the program storage server 16. It is desirable that the program executing apparatus 22 hold an IP address of the program storage server 16 in advance.

The program executing apparatus 22 generates an execution program on the basis of the API program and the logic program, and runs the generated execution program. In running the execution program, the program executing apparatus 22 accesses the application server 15 and the operation server 20 over the network 17 (steps S104 and S205).

Figure 12:
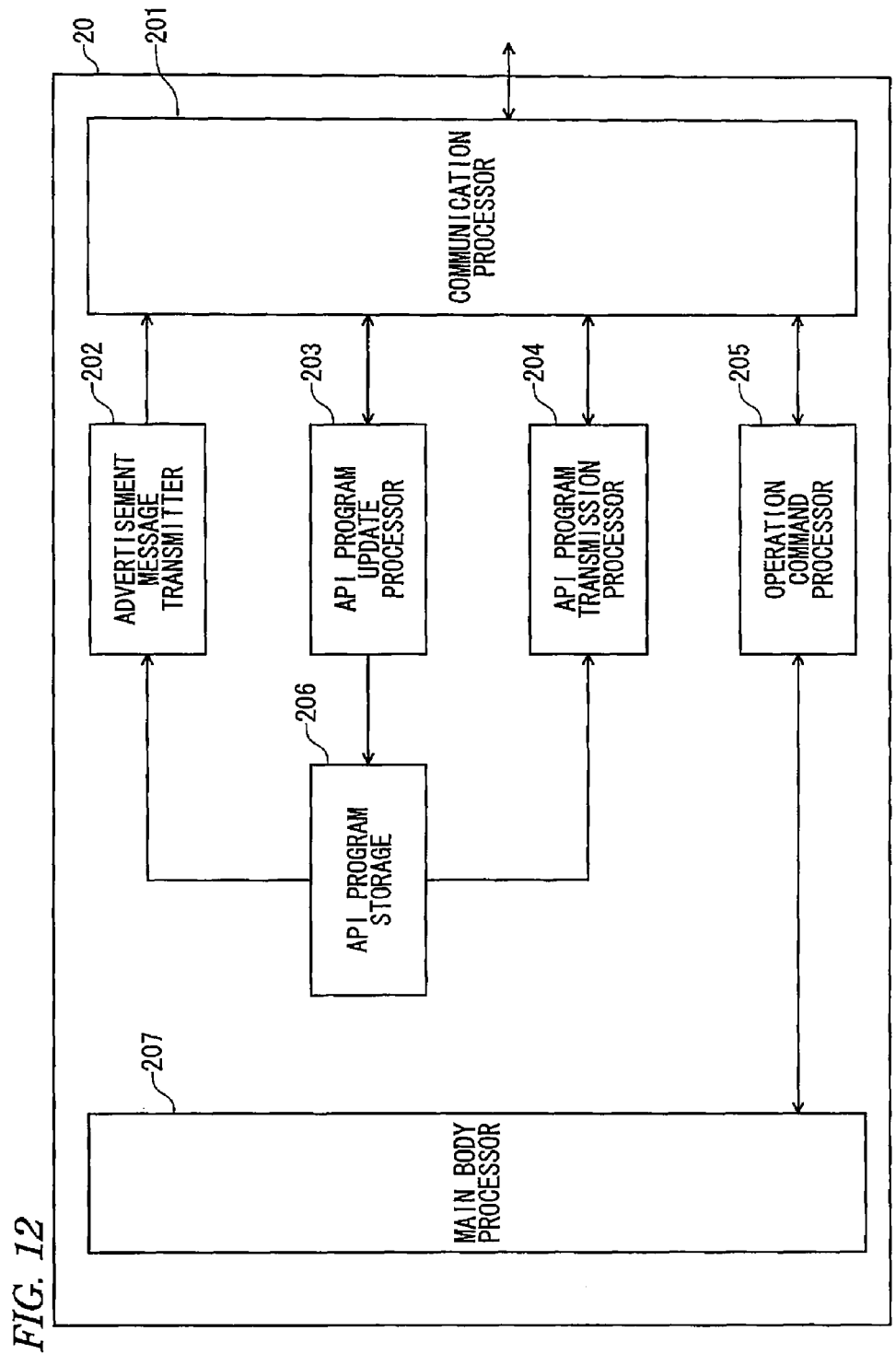
FIG. 12 is a block diagram of each operating apparatus 20 of the system of FIG. 10.

Next, the configuration of each operating apparatus 20 will be described. FIG. 12 is a block diagram showing the configuration of each operating apparatus 20.

A main body processor 207 performs processing that relates to inherent operations of the operating apparatus 20. For example, where the operating apparatus 20 is a TV receiver, the inherent operations are operations of receiving and demodulating a TV broadcast signal and displaying video on the screen according to remote control signals, a broadcast-wave signal, and pressing of external buttons.

A communication processor 201 exchanges data with the network 17 according to a predetermined communication procedure.

An advertisement message transmitter 202 sends out an advertisement message regularly using preset information. Where plural API programs are held by an API program storage 206 (described later), API acquisition URLs to be sent being contained in an advertisement message be prepared for the respective API programs to enable designation and acquisition of each API program.

The API program storage 206 holds an API program(s). It is preferable that the API program storage 206 be able to hold plural API programs.

An API program update processor 203 performs, via the network 17, processing of adding a new API program or deleting or updating the/an API program stored in the API program storage 206.

When receiving an API program acquisition request over the network 17, an API program transmission processor 204 extracts a requested API program from the API program storage 206 according to an API acquisition URL contained in the API program acquisition request and sends the extracted API program to the request party over the network 17.

When receiving an operation command over the network 17, an operation command processor 205 supplies a control command to the main body processor 207 according to the received operation command. If the operation command requests acquisition of information indicating an operation state, the operation command processor 205 extracts such information from the main body processor 207 and sends the extracted information to the sender of the operation command over the network 17.

In the modification, it suffices that an operating apparatus 20 send an API program to a program executing apparatus 22 at most one time. In contrast, a conventional control apparatus which has a HTTP server and is controlled by an external Web browser over a network sends a control command corresponding to a user manipulation of the Web browser to an operating apparatus as HTTP POST or GET data. Receiving the control command, the operating apparatus performs an operation according to the control command and returns a response. The response contains a program to be used for sending the next control command from the Web browser. In this manner, the operating apparatus sends a program for control every time it receives a control command. According to the modification, since it suffices to send an API program at most one time, the load of the network 17 can be reduced and the throughput of communication processing of each operating apparatus 20 can be reduced.

The above-described modification of the first embodiment is different from the first embodiment in that each of the operating apparatus 20 and the program executing apparatus 22 is an apparatus obtained by integrating two apparatus used in the first embodiment, and has the same functions as the first embodiment in the other respects. Therefore, the system according to the modification can provide the same advantages as the system according to the first embodiment.

Next, second and third embodiments will be described which are specific examples of the system according to the first embodiment.

Embodiment 2

Figure 13:
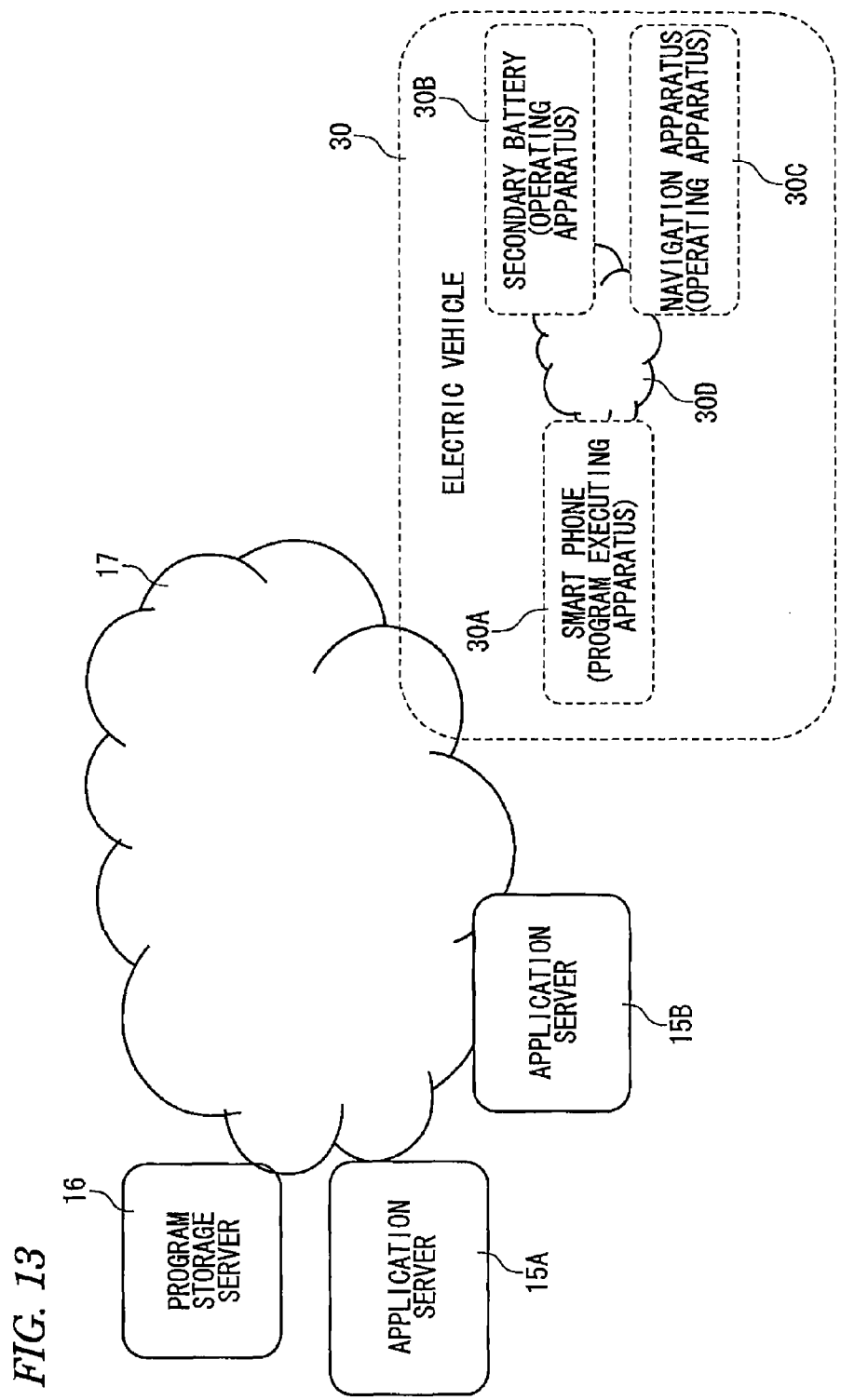
FIG. 13 is a block diagram of a system according to a second embodiment.

FIG. 13 is a block diagram of a system according to the second embodiment.

In the system according to the second embodiment, a program storage server 16, application servers 15A and 15B, and an electric vehicle 30 are connected to each other via a network 17. The electric vehicle 30 is equipped with a smart phone 30A, a secondary battery 30B, and a navigation apparatus 30C. The secondary battery 30B and the smart phone 30A are connected to each other via an intravehicle network 30D (e.g., wireless LAN, Bluetooth, or CAN (car area network). The navigation apparatus 30C and the smart phone 30A are also connected to each other via the intravehicle network 30D. Although in the example of FIG. 13 the same intravehicle network 30D serves for the connection between the secondary battery 30B and the smart phone 30A and the connection between the navigation apparatus 30C and the smart phone 30A, different networks may serve for these two kinds of connection.

Each of the secondary battery 30B and the navigation apparatus 30C corresponds to the operating apparatus 20 used in the modification of the first embodiment. Like the operating apparatus 20, each of the secondary battery 30B and the navigation apparatus 30C is equipped with the API program storage 206. The smart phone 30A corresponds to the program executing apparatus 22 used in the modification of the first embodiment. As such, the system according to the second embodiment has two operating apparatus 20.

The smart phone 30A can acquire a charging/discharge level, a residual capacity, and a temperature of the secondary battery 30B every predetermined short time (e.g., every one minute) by accessing the secondary battery 30B over the network 30D using an API program stored in the API program storage 206 of the secondary battery 30B.

Furthermore, the smart phone 30A can acquire current position information and speed information (including speed in formation in the running direction) of the electric vehicle 30 by accessing the navigation apparatus 30C over the network 30D using an API program stored in the API program storage 206 of the navigation apparatus 30C.

Next, how the system according to the second embodiment operates will be described.

Figure 14:
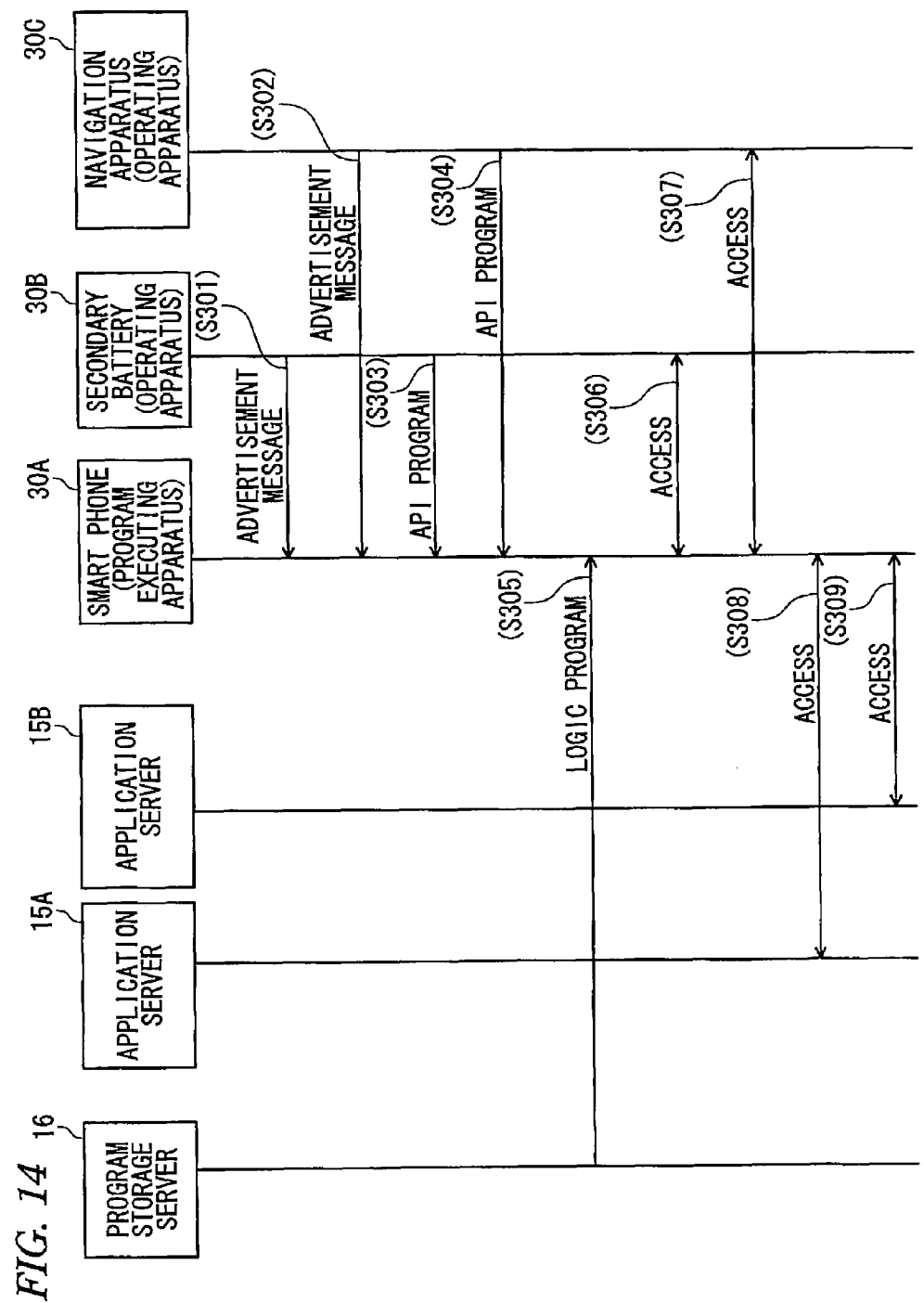
FIG. 14 is a sequence diagram showing how the system of FIG. 13 operates.

FIG. 14 is a sequence diagram showing how the system according to the second embodiment operates.

First, at step S301, the secondary battery 30B sends out an advertisement message regularly.

At step S302, the navigation apparatus 30C sends out an advertisement message regularly.

At step S303 and S304, the smart phone 30A acquires API programs from the secondary battery 30B and the navigation apparatus 30C using API acquisition URLs contained in the advertisement messages received at steps S301 and S302, respectively.

At step S305, the smart phone 30A acquires a logic program from the preset program storage 16. The smart phone 30A generates an execution program on the basis of the thus-acquired logic program and the API programs acquired from the secondary battery 30B and the navigation apparatus 30C, and runs the generated execution program. In running the execution program, the smart phone 30A accesses the secondary battery 30B, the navigation apparatus 30C, and the application servers 15A and 15B (steps S306-S309).

More specifically, the smart phone 30A acquires position information and speed information by accessing the navigation apparatus 30C (step S307) by running the execution program and acquires neighborhood map information from the application server 15A (step S308) by sending the acquired position information and speed information to it. It is assumed that the application server 15A does a service of providing neighborhood map information.

The smart phone 30A acquires a charging/discharge level, a residual capacity, and a temperature from the secondary battery 30B (step S306) by running the execution program and acquires a possible running distance from the application server 15B (step S309) by sending the thus-acquired charging/discharge level, residual capacity, and temperature and the speed information acquired at step S307. It is assumed that the application server 15B does a service of calculating a possible running distance of an electric vehicle.

The smart phone 30A displays a possible running range 31C on its screen 31A on the basis of the neighborhood map information and the possible running distance by running the execution program.

Figure 15:
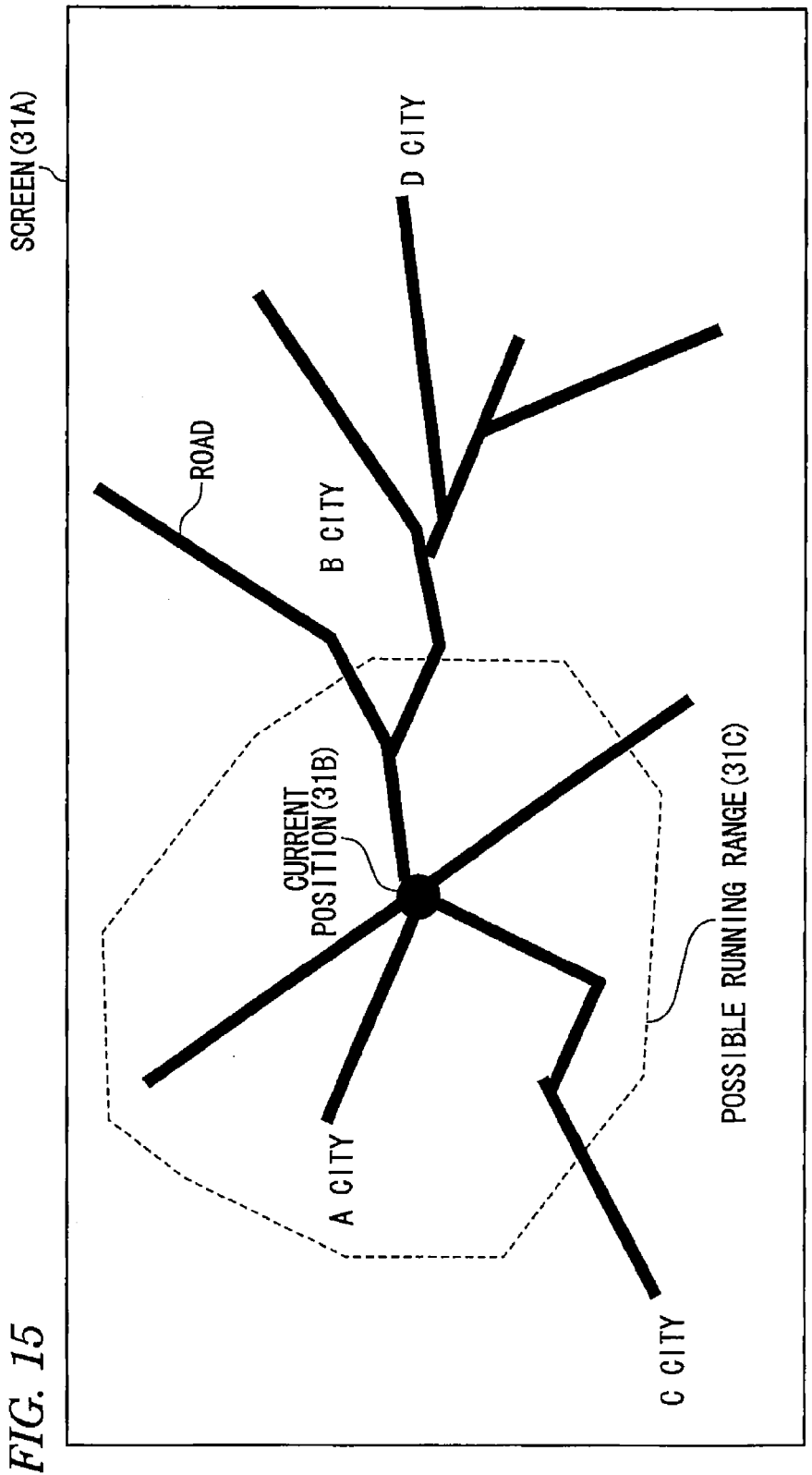
FIG. 15 shows an example possible running range 31C which is displayed by a smart phone 30A on its screen.

FIG. 15 shows an example possible running range 31C which is displayed by the smart phone 30A on its screen 31A.

The map of FIG. 15 is not a map centered by a current position 31B and an area located on the right of the current position 31B is displayed more widely because the electric vehicle 30 is running rightward. And the possible running range 31C which is enclosed by a broken line (actually a red line) is narrower on the right side than on the left wide because roads displayed on the right side are more congested.

In the above-described example, when plural electric vehicles 30 send their positions to the application server 15B, the application server 15B can calculate a possible running distance taking road congestion statuses into consideration.

In general, it is difficult to determine a residual capacity of the secondary battery 30B correctly. However, since a possible running distance is calculated on the application server side, it is possible to collect real data, improve a calculation algorithm on the basis of the collected data, and introduce a new algorithm. By sending an improved or newly introduced calculation algorithm to the smart phone 30A as a logic program, the smart phone 30A can execute a complicated calculation algorithm that could not be executed with calculation ability at the time of designing of the electric vehicle 30. Since the smart phone 30A need not communicate with the application servers 15A and 15B all the time, an advantage is obtained that the power consumption of the smart phone 30A is reduced.

Embodiment 3

Figure 16:
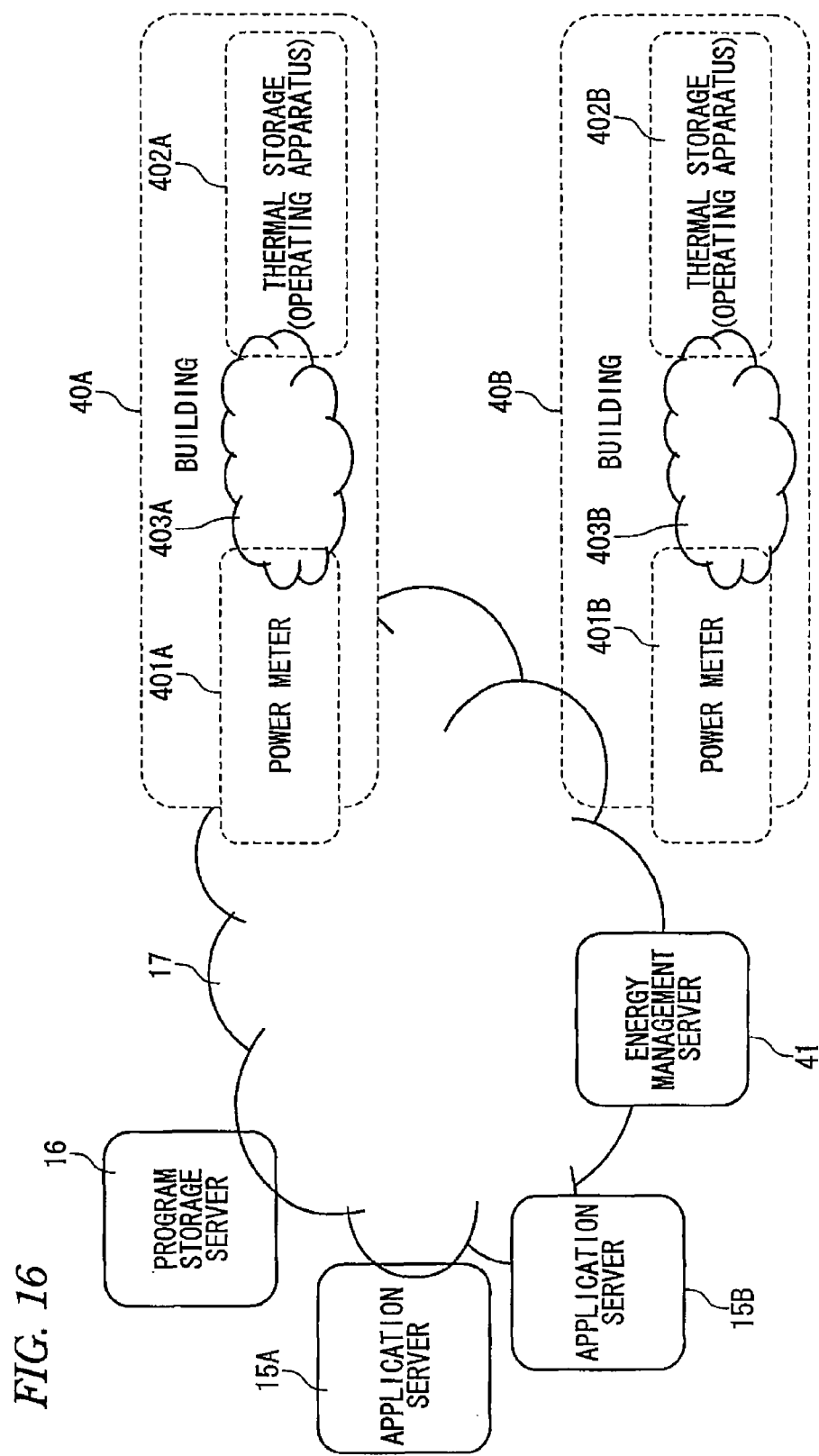
FIG. 16 is a block diagram of a system according to a third embodiment.

FIG. 16 is a block diagram of a system according to the third embodiment.

In the system according to the third embodiment, a program storage server 16, two application servers 15A and 15B, an energy management server 41, and buildings 40A and 40B are connected to each other via a network 17.

The building 40A is equipped with a power meter 401A and a thermal storage 402A which are connected to each other via a network 403A. The building 40B is equipped with a power meter 401B and a thermal storage 402B which are connected to each other via a network 403B.

The energy management server 41 corresponds to the program executing apparatus 22 used in the modification of the first embodiment. Each of the thermal storages 402A and 402B corresponds to the operating apparatus 20 used in the modification of the first embodiment.

The power meter 401A measures power consumptions of the building 40A and sends a measurement result to the application server 15A. Various levels are conceivable as to how closely the power meter 401A should measure power consumptions; it may measure a power consumption for every floor, room, or socket in the building 40A. The power meter 401B has the same functions as the power meter 401A.

The thermal storage 402A is equipped with a heat generation unit (or heat absorption unit) such as a heat pump and a heat accumulation unit for accumulating high-temperature heat or low-temperature heat by means of a water tank. The heat accumulation unit may accumulate low-temperature heat in the form of ice rather than cool water. The thermal storage 402A accumulates heat that is obtained by driving a heat pump using electric power in a time slot (e.g., late night) when the charge for electricity (or gas) is low. Accumulated heat is used for hot-water supply, air-conditioning, floor heating, and other purposes in a time slot when the electricity charge is high, whereby the user can enjoy reduction in electricity charge and a power company can be given a benefit of peak power reduction. Accumulated heat is dissipated to the environment. Therefore, it is important to estimate a minimum amount of heat that is necessary to the next heat accumulation timing (in general, the next late night) and accumulate that amount of heat. The thermal storage 402B has the same functions as the thermal storage 402A.

The energy management server 41 estimates a necessary amount of heat to be accumulated and informs the thermal storage 402A of the estimated value.

The application server 15B is, for example, a site of the Meteorological Agency and provides weather forecast information from today to the next day.

Figure 17:
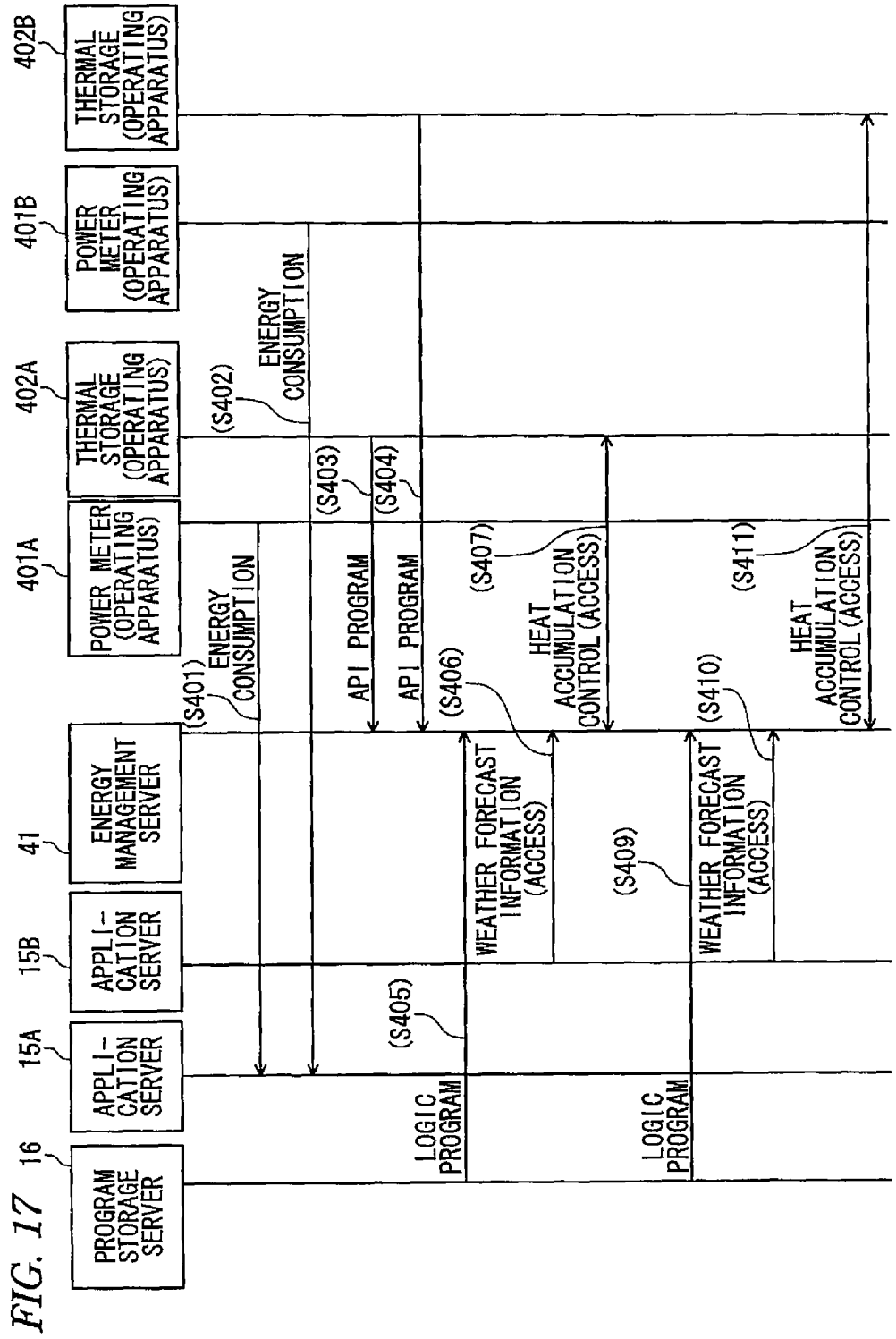
FIG. 17 is a sequence diagram showing how the system of FIG. 16 operates.

Next, how the system according to the third embodiment operates will be described. FIG. 17 is a sequence diagram showing how the system according to the third embodiment operates.

First, at steps S401 and S402, the power meters 401A and 401B regularly inform the application server 15A of respective energy consumptions which have been consumed in a predetermined period (e.g., one minute). The energy consumption measurement period and the energy consumption reporting interval need not coincide with each other. It is desirable that a reported energy consumption be accompanied by energy consumption time information. The time information can be omitted in the case where the energy consumption measurement period and the energy consumption reporting interval are identical.

At steps S403 and S404, the energy management server 41 acquires API programs for the thermal storages 402A and 402B from themselves, respectively. Although omitted in FIG. 17, the thermal storages 402A and 402B send advertisement messages to the address of the energy management server 41, whereby the energy management server 41 can acquire API programs from the thermal storages 402A and 402B. The acquisition sources of API programs need not always be the thermal storages 402A and 402B and may be other apparatus as in the first embodiment.

At steps S405 and S409, the energy management server 41 acquires logic programs from the program storage server 16. It is preferable that the users of the thermal storages 402A and 402B be able to select respective logic programs in advance. For example, the user of each of the thermal storages 402A and 402B selects a logic program according to the number of persons who use the thermal storages 402A or 402B and the family structure (e.g., there are three women). The user selects a logic program using a Web browser, for example.

The energy management server 41 generates execution programs on the basis of the logic programs and the API programs and runs the generated execution programs. In the embodiment, where the users of the thermal storages 402A and 402B are different from each other, it is desirable that the energy management server 41 run different execution programs for the respective thermal storages 402A and 402B.

By running the execution programs, the energy management server 41 acquires pieces of weather information from the application server 15B at steps S406 and S410, respectively, and controls the heat accumulation amounts of the thermal storages 402A and 402B using the acquired pieces of weather information at steps S407 and S411, respectively.

Furthermore, the application server 15A provides, for example, one-month data of energy consumptions in a prescribed period (e.g., one hour) of each user. Each user can access one-month data using a Web browser. Since the application server 15A has such a function, users who are friends in Facebook (trade name), for example, can share their energy consumption data and thereby share the knack of energy saving or information of logic programs used. Each of such users can re-select a favorable logic program (typically, a logic program that is being used by a fiend whose energy consumption is lowest among friends who are similar to the user in the size and heat insulation performance of a house, appliances used in a house, or lifestyle).

Figure 18:
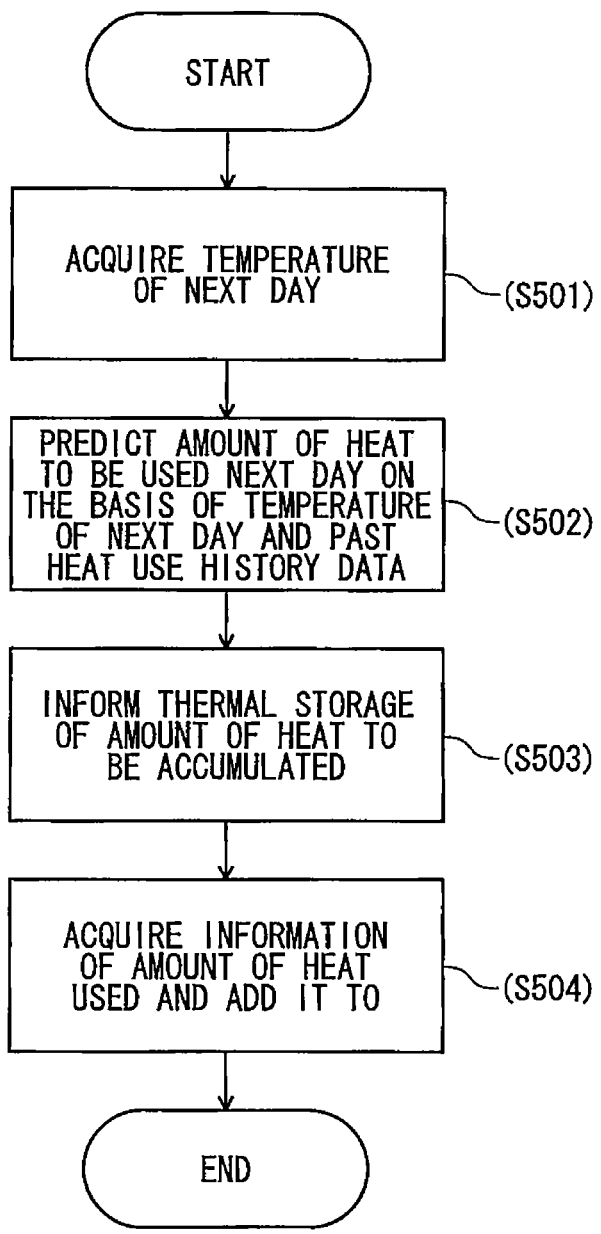
FIG. 18 is a flowchart of an example heat accumulation control algorithm of an execution program which is run by an energy management server 41 shown in FIG. 16.

Next, an example algorithm of an execution program which is run by the energy management server 41 will be described. FIG. 18 is a flowchart of an example heat accumulation control algorithm of an execution program which is run by the energy management server 41.

First, at step S501, the execution program acquires weather forecast information of the next day of an area where the house of the user exists before the late-night power period (e.g., AM 0:00 to AM 5:00). In this example, a temperature is acquired as weather forecast information. The weather forecast information is not limited to a temperature. For example, where the user is using a photovoltaic power generator or a wind power generator, an amount of sunshine or wind is employed as the weather forecast information to take into consideration an amount of energy to be generated by it.

At step S502, the execution program predicts an amount of heat to be consumed next day. The execution program holds heat use history data (dates, temperatures, and amounts of heat used) of the user, and predicts an amount of heat to be consumed next day by extracting, from the history data, the amounts of heat used of data whose temperatures correspond to the temperature of the next day and averaging the extracted amounts of heat used. Temperatures of data to be used for averaging need not always be completely equal to the temperature of the next day and may be within a prescribed value of the latter. The averaging of extracted amount of heat used need not always be simple averaging; various averaging methods may be used such as weighted averaging in which a larger weight is given to newer data. The heat use history data may be such that data is taken for every period that is shorter than one day (e.g., every hour).

At step S503, the execution program instructs the thermal storage 402A or 402B to accumulate an amount of heat that is equal to the amount of heat predicted at step S502.

At step S504, the execution program regularly acquires information of an amount of heat from the thermal storage 402A or 402B and adds the acquired information to the heat use history data.

The description of the example algorithm of an execution program completes here.

As described above, an energy control that is suitable for an apparatus used by a user and its use conditions by causing the energy management server 41 to run a logic program selected by the user. A user is allowed to select an optimum logic program through collaboration with a social network such as Facebook (trade name) or a bulletin board service.

The above-described embodiments can provide a program generator which generates a program which makes it possible to provide a service on a network that utilizes a function of an apparatus according to the apparatus function irrespective of whether the standard communication protocol of the apparatus has been updated or not.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A program generating apparatus including a processor comprising:

a generator configured to generate a first program based on a second program, which second program is an application program interface (API) program stored in an API storage, and a third program stored in a program storage server, wherein the second program is extracted based on an advertisement message including (1) an apparatus type identifier that indicates whether a device sending the advertisement message is an operating apparatus, an API storage, or a program executing apparatus, (2) an individual apparatus identifier uniquely identifying the apparatus sending the advertisement message, and (3) an IP address assigned to the apparatus sending the advertisement message, and comprises a communication procedure of communicating with an operating apparatus through a network to utilize a function of the operating apparatus, wherein the third program does not comprise the communication procedure, but comprises a correlation procedure of correlating a first service which is provided through the network and the function of the operating apparatus using the communication procedure to collaborate with each other, and wherein the first program comprises a realization procedure of realizing a collaboration service in which the first service and the function of the operating apparatus collaborate with each other through the network.

2. The program generating apparatus of claim 1, further comprising:

a transmitter configured to transmit the first program to a program executing apparatus which realizes the collaboration service using the first program, through the network.

3. The program generating apparatus of claim 1, further comprising:

an execution module configured to realize the collaboration service using the first program.

4. The program generating apparatus of claim 1, further comprising:

a first acquisition module configured to acquire the second program through the network.

5. The program generating apparatus of claim 1, further comprising:

a second acquisition module configured to acquire the third program through the network.

6. The program generating apparatus of claim 4, wherein the second program is stored in the operating apparatus, and the acquisition module is configured to acquire the second program from the operating apparatus.

7. The program generating apparatus of claim 1, further comprising:

a second acquisition module configured to select and acquire a program capable of realizing the collaboration service as the third program.

8. The program generating apparatus of claim 1, further comprising:

a human interface processor configured to display a plurality of the first programs on a screen such that one of the plurality of the first programs, which comprises a desired collaboration service, can be selected from the screen.

9. The program generating apparatus of claim 3, wherein:

the program generating apparatus is connected to an application server which provides the first service, through the network;

the execution module communicates with the application server so as to realize the collaboration service.

10. The program generating apparatus of claim 9, wherein the execution module is a Web browser configured to display information by receiving HTML data from the application server.

11. A program generation method comprising:
generating, by a processor, a first program based on a second program, which second program is an application program interface (API) program stored in an API storage, and a third program stored in a program storage server,
wherein the second program is extracted based on an advertisement message including (1) an apparatus type identifier that indicates whether a device sending the advertisement message is an operating apparatus, an API storage, or a program executing apparatus, (2) an individual apparatus identifier uniquely identifying the apparatus sending the advertisement message, and (3) an IP address assigned to the apparatus sending the advertisement message, and comprises a communication procedure of communicating with an operating apparatus through a network to utilize a function of the operating apparatus,
wherein the third program does not comprise the communication procedure, but comprises a correlation procedure of correlating a first service which is provided through the network and the operating apparatus using the communication procedure to collaborate with each other, and
wherein the first program comprises a realization procedure of realizing a collaboration service in which the first service and a function of the operating apparatus collaborate with each other through the network.

12. A non-transitory computer-readable medium storing a program for causing a computer to generate a first program based on a second program, which second program is an application program interface (API) program stored in an API storage, and a third program stored in a program storage server,
wherein the second program is extracted based on an advertisement message including (1) an apparatus type identifier that indicates whether a device sending the advertisement message is an operating apparatus, an API storage, or a program executing apparatus, (2) an individual apparatus identifier uniquely identifying the apparatus sending the advertisement message, and (3) an IP address assigned to the apparatus sending the advertisement message, and comprises a communication procedure of communicating with an operating apparatus through a network to utilize a function of the operating apparatus,
wherein the third program does not comprise the communication procedure, but comprises a correlation procedure of correlating a first service which is provided through the network and the operating apparatus using the communication procedure to collaborate with each other, and
wherein the first program comprises a realization procedure of realizing a collaboration service in which the first service and a function of the operating apparatus collaborate with each other through the network.

13. The program generating apparatus of claim 1, wherein the third program is a logic program using an application program interface (API) program.

14. The program generating apparatus of claim 1, wherein the operating apparatus is a TV receiver.

15. The program generating apparatus of claim 1, wherein the collaboration service is realized by a program executing apparatus running the first program.

\* \* \* \* \*